United States Patent
Kim et al.

(10) Patent No.: US 10,172,115 B2
(45) Date of Patent: Jan. 1, 2019

(54) METHOD AND APPARATUS FOR CONDUCTING DEVICE-TO-DEVICE COMMUNICATION IN WIRELESS COMMUNICATION SYSTEM

(71) Applicant: LG ELECTRONICS INC., Seoul (KR)

(72) Inventors: Myoungseob Kim, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 14/911,212

(22) PCT Filed: Aug. 8, 2014

(86) PCT No.: PCT/KR2014/007392
§ 371 (c)(1),
(2) Date: Feb. 9, 2016

(87) PCT Pub. No.: WO2015/020484
PCT Pub. Date: Feb. 12, 2015

(65) Prior Publication Data
US 2016/0183219 A1      Jun. 23, 2016

Related U.S. Application Data

(60) Provisional application No. 61/864,520, filed on Aug. 9, 2013.

(51) Int. Cl.
*H04W 72/04* (2009.01)
*H04W 52/38* (2009.01)
(Continued)

(52) U.S. Cl.
CPC .......... *H04W 72/04* (2013.01); *H04W 52/38* (2013.01); *H04W 72/0406* (2013.01);
(Continued)

(58) Field of Classification Search
CPC . H04W 72/04; H04W 52/38; H04W 72/0406; H04W 52/383; H04W 92/18;
(Continued)

(56) References Cited

U.S. PATENT DOCUMENTS

2002/0107024 A1*  8/2002  Dev Roy ............. H04W 16/02
                                                                        455/447
2013/0150061 A1   6/2013  Shin et al.
(Continued)

FOREIGN PATENT DOCUMENTS

| KR | 10-2012-0074255 A | 7/2012 |
| KR | 10-2013-0065373 A | 11/2012 |
| WO | WO 2012/159270 A1 | 11/2012 |

*Primary Examiner* — Omar J Ghowrwal
(74) *Attorney, Agent, or Firm* — Birch, Stewart, Kolasch & Birch, LLP

(57) ABSTRACT

A method for performing Device-to-Device (D2D) communication in a wireless communication system according to the present invention, the method according to the present invention comprises transmitting, by a D2D transmitting UE, a first message requesting allocation of radio resources to be used for D2D communication to an eNB; receiving, by the D2D transmitting UE, a second message including radio resource allocation information from the eNB; and transmitting, by the D2D transmitting UE, data through a radio resource area allocated by the second message, wherein the data are transmitted to the eNB and at least one D2D receiving UE.

6 Claims, 23 Drawing Sheets

(51) Int. Cl.
*H04W 92/18* (2009.01)
*H04L 5/00* (2006.01)

(52) U.S. Cl.
CPC ......... *H04L 5/0007* (2013.01); *H04W 52/383* (2013.01); *H04W 72/042* (2013.01); *H04W 72/0413* (2013.01); *H04W 92/18* (2013.01)

(58) Field of Classification Search
CPC ............ H04W 72/042; H04W 72/0413; H04L 5/0007
See application file for complete search history.

(56) References Cited

U.S. PATENT DOCUMENTS

| | | | |
|---|---|---|---|
| 2013/0322388 A1 | 12/2013 | Ahn et al. | |
| 2014/0105096 A1* | 4/2014 | Wang | H04L 12/189 370/312 |
| 2014/0313949 A1* | 10/2014 | Lilleberg | H04W 28/065 370/280 |
| 2014/0321423 A1* | 10/2014 | Kalhan | H04W 76/023 370/330 |
| 2014/0328329 A1* | 11/2014 | Novlan | H04W 72/042 370/336 |
| 2015/0056983 A1* | 2/2015 | Cho | H04W 76/021 455/426.1 |
| 2016/0021526 A1* | 1/2016 | Niu | H04W 72/0413 370/230 |
| 2016/0113050 A1* | 4/2016 | Li | H04W 52/0209 370/329 |
| 2016/0374068 A1* | 12/2016 | Kim | H04W 72/04 |

* cited by examiner (A)

(B)

(A)

(B)

(a)

(b)

METHOD AND APPARATUS FOR CONDUCTING DEVICE-TO-DEVICE COMMUNICATION IN WIRELESS COMMUNICATION SYSTEM

CROSS REFERENCE TO RELATED APPLICATIONS

This application is the National Phase of PCT International Application No. PCT/KR2014/007392, filed on Aug. 8, 2014, which claims priority under 35 U.S.C. 119(e) to U.S. Provisional Application No. 61/864,520, filed on Aug. 9, 2013, all of which are hereby expressly incorporated by reference into the present application.

TECHNICAL FIELD

The present invention is related to a method and an apparatus for performing Device-to-Device (D2D) communication in a wireless communication system.

BACKGROUND ART

D2D communication refers to a radio technology which enables a plurality of devices (for example, a plurality of terminals) to exchange voice, data, and so on directly with each other without involving a base station. D2D communication includes UE-to-UE communication and peer-to-peer communication. Also, D2D communication can be applied to Machine-to-Machine (M2M) communication, Machine Type Communication (MTC), and others.

D2D communication is being considered as one of solutions that can relieve the burden of a base station due to rapidly growing data traffic. For example, different from existing wireless communication systems, D2D communication enables devices to communicate data directly with each other without employing a base station, thereby reducing overload on a network.

Also, D2D communication provides advantageous effects such as simplification of a procedure in a base station, reduction of power consumption for devices participating in D2D communication, increase of data transmission speed, extension of network capacity, distribution of communication load, and extension of cell coverage.

DISCLOSURE

Technical Problem

The present invention has been made in an effort to provide a D2D communication method in various network coverage situations.

Also, the present invention has been made in an effort to provide a clustering and cluster head concepts to reduce power consumption of a D2D terminal and to minimize interference among D2D terminals.

Also, the present invention has been made in an effort to provide a method for controlling a cluster size and transmission power allocation according to a cell loading factor.

Also, the present invention has been made in an effort to provide a method for performing switching of a D2D terminal from a transmission mode to a reception mode or vice versa.

Technical objects of the present invention are not limited to those objects described above; other technical objects not mentioned above can be clearly understood from the description below by those skilled in the art to which the present invention belongs.

Technical Solution

A method for performing Device-to-Device (D2D) communication in a wireless communication system according to the present invention comprises a D2D transmitting terminal's transmitting a first message requesting allocation of radio resources to be used for D2D communication to a base station; the D2D transmitting terminal's receiving a second message including radio resource allocation information from the base station; and the D2D transmitting terminal's transmitting data through a radio resource area allocated by the second message, where the data are transmitted to the base station and at least one D2D receiving terminal.

According to the present invention, the data are transmitted to the base station repeatedly by a predetermined number of times.

According to the present invention, the method further comprises the D2D transmitting terminal's receiving a response related to the data transmission from the base station.

According to the present method, if the data transmission fails, the data are re-transmitted to the at least one D2D receiving terminal from the base station.

According to the present invention, the D2D transmitting terminal and part of the at least one D2D receiving terminal form a group, and the D2D transmitting terminal receives a response related to the uplink data transmission from a D2D receiving terminal included in the group.

According to the present invention, the allocated radio resource area includes a D2D link signal transmission interval and a Guard Interval (GI), where the GI is a time interval for switching from a transmission mode to a reception mode or vice versa.

According to the present invention, the GI is disposed at either of the front and rear part of the D2D link signal transmission interval.

According to the present invention, the GI is part of a Single Carrier Frequency Division Multiple Access (SC-FDMA) symbol interval or an SC-FDMA 1 symbol.

According to the present invention, the D2D transmitting terminal and the at least one D2D receiving terminal are in an idle state.

A method for performing D2D communication in a wireless communication system according to the present invention comprises a D2D transmitting terminal's transmitting a first message requesting allocation of radio resources to be used for D2D communication to a cluster head terminal; the D2D transmitting terminal's receiving a second message including radio resource allocation information from the cluster head terminal; and the D2D transmitting terminal's transmitting data through a radio resource area allocated by the second message, where the data are transmitted to the cluster head terminal and at least one D2D receiving terminal, and the D2D transmitting terminal, the cluster head terminal, and the at least one D2D receiving terminal form a cluster.

According to the present invention, a second message transmitted from the cluster head terminal is monitored by the at least one D2D receiving terminal.

According to the present invention, the radio resource allocation information includes timing information related to signal transmission and/or signal reception of each D2D terminal.

According to the present invention, the timing information is a period or an offset.

According to the present invention, the cluster size is changed according to a cell loading factor, and if the cell loading factor is larger than a threshold, the cluster size becomes small, whereas the cluster size becomes large if the cell loading factor is smaller than the threshold.

According to the present invention, if the cluster size becomes small, transmission power of D2D terminals within the cluster is set to a low value, whereas transmission power of D2D terminals within the cluster is set to a high value if the cluster size becomes large.

According to the present invention, the method further comprises the D2D transmitting terminal's relaying the second message to a specific D2D terminal if the specific D2D terminal among the at least one D2D receiving terminal is located outside the network coverage supported by the base station.

A D2D transmitting terminal performing D2D communication in a wireless communication system according to the present invention comprises a communication unit configured to communicate with the outside in a wireless or a wired manner; and a processor functionally connected to the communication unit, where the processor is configured to transmit a first message requesting allocation of radio resources to be used for D2D communication to an base station; to receive a second message including radio resource allocation information from the base station; and to transmit data through a radio resource area allocated by the second message, where the data are transmitted to the base station and at least one D2D receiving terminal.

The processor according to the present invention is configured to relay the second message to a specific D2D terminal if the specific D2D terminal among the at least one D2D receiving terminal is located outside the network coverage supported by the base station.

A D2D transmitting terminal performing D2D communication in a wireless communication system according to the present invention comprises a communication unit configured to communicate with the outside in a wireless or a wired manner; and a processor functionally connected to the communication unit, where the processor is configured to transmit a first message requesting allocation of radio resources to be used for D2D communication to a cluster head terminal; to receive a second message including radio resource allocation information from the cluster head terminal; and to transmit data through a radio resource area allocated by the second message, where the data are transmitted to the cluster head terminal and at least one D2D receiving terminal; and the D2D transmitting terminal, the cluster head terminal, and the at least one D2D receiving terminal form a cluster.

Advantageous Effects

The present invention provides an advantageous effect of enabling D2D communication in various network coverage situations.

Also, the present invention provides an advantageous effect of reducing power consumption of D2D terminals through clustering and a cluster head and minimizing interference among D2D terminals.

Also, the present invention provides an advantageous effect of reducing power consumption by controlling cluster size according to a cell loading factor and allocation of transmission power of D2D terminals within the cluster.

Also, the present invention provides an advantageous effect of switching a D2D terminal from a transmission mode to a reception mode or vice versa by defining a guard interval.

Advantageous effects that can be obtained by applying the present invention are not limited to the aforementioned effects, and other advantageous effects not mentioned above can be clearly understood from the description below by those skilled in the art to which the present invention belongs.

MODE FOR INVENTION

Figure 1:
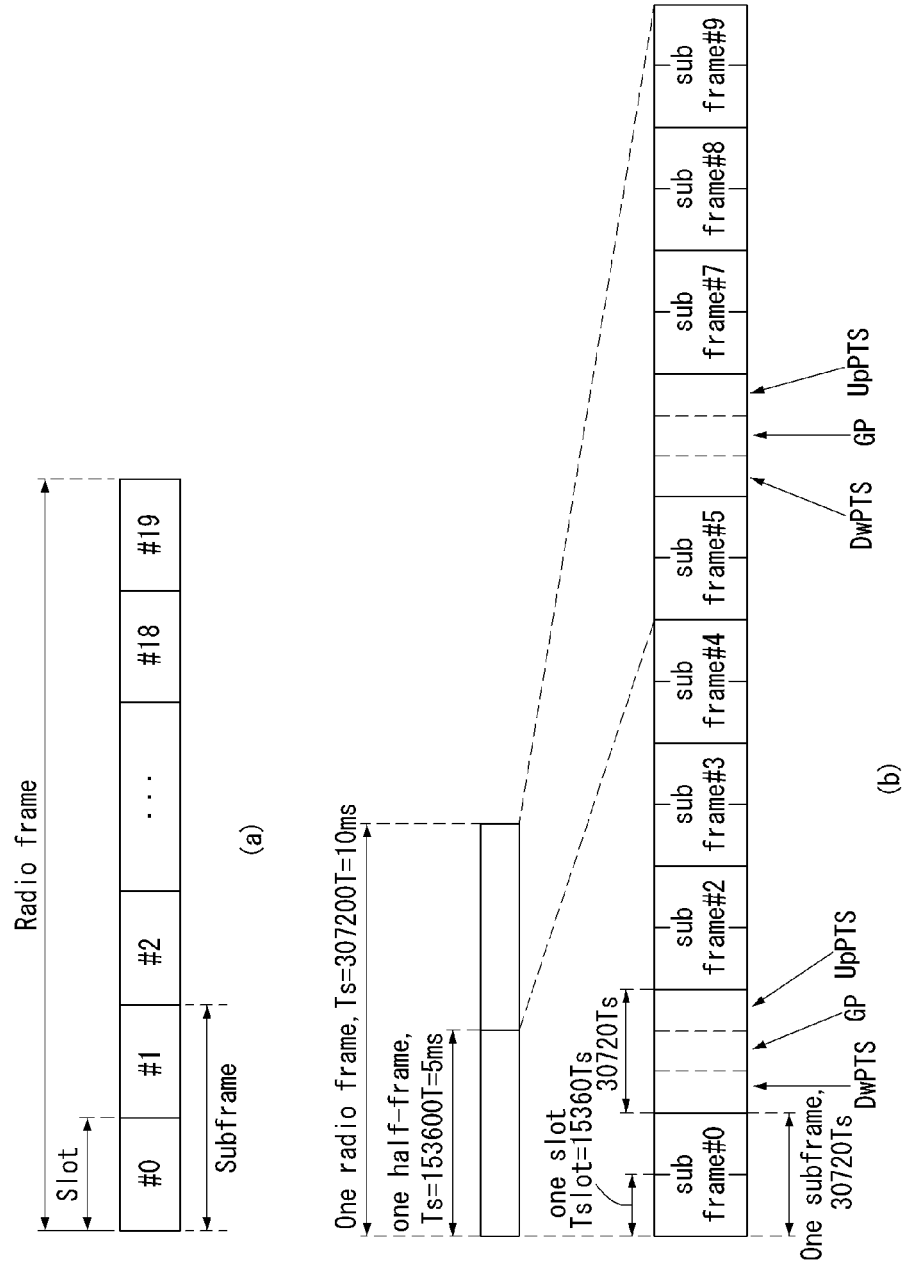
FIG. 1 illustrates a structure of a radio frame defined in the 3GPP LTE(-A) specification.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be carried out by the base station may be carried out by a upper node of the base station depending on situations. In other words, it is apparent that in a network consisting of a plurality of network nodes including a base station, various operations carried out for communication with a UE can be carried out by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 WI-FI)), the IEEE 802.16 (WIMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

FIG. 1 illustrates a structure of a radio frame.

In the cellular OFDM wireless packet communication system, transmission of uplink/downlink data packets is carried out in units of subframes, and one subframe is defined as a predetermined time period including a plurality of OFDM symbols. A type 1 radio frame structure that can be applied to frequency division duplex (FDD) scheme and a type 2 radio frame structure that can be applied to time division duplex (TDD) scheme. In the FDD mode, uplink transmission and downlink transmission are carried out separately in the respective frequency bands. On the other hand, for the TDD mode, uplink and downlink transmission are carried out separately in the time domain but occupy the same frequency band. Channel responses in the TDD mode are in fact reciprocal. This implies that a downlink channel response is virtually the same as the corresponding uplink channel response in the frequency domain.

Therefore, it can be regarded as an advantage for a wireless communication system operating in the TDD mode that a downlink channel response can be obtained from an uplink channel response. Since the whole frequency domain is so utilized in the TDD mode that uplink and downlink transmission are performed in time division fashion, downlink transmission by an eNB and uplink transmission by a UE cannot be performed simultaneously. In a TDD system where uplink and downlink transmission are managed in units of subframes, uplink and downlink transmission are carried out separately in the respective subframes.

FIG. 1(a) illustrates a structure of a type 1 radio frame. A downlink radio frame consists of 10 subframes, and each subframe consists of two slots in the time domain. The time period needed to transmit one subframe is called a Transmission Time Interval (TTI). For example, length of each subframe can amount to 1 ms, and length of each slot can be 0.5 ms. Each slot includes a plurality of orthogonal frequency division multiplexing (OFDM) symbols in the time domain, and includes a plurality of resource blocks (RBs) in the frequency domain. The 3GPP LTE-A system uses the OFDMA method for downlink transmission; therefore, the OFDM symbol is intended to represent one symbol interval. One OFDM symbol may be regarded to correspond to one SC-FDMA symbol or a symbol interval. The resource block as a unit for allocating resources includes a plurality of consecutive subcarriers within one slot.

The number of OFDM symbols included within one slot can be varied according to the configuration of a cyclic prefix. The CP has an extended CP and a normal CP. For example, in case the OFDM symbol consists of normal CPs, the number of OFDM symbols included within one slot can be 7. In case the OFDM symbol consists of extended CPs, the number of OFDM symbols included within one slot becomes smaller than that for the normal CP case since the length of a single OFDM is increased. In the case of extended CP, for example, the number of OFDM symbols included within one slot can be 6. In case a channel condition is unstable as observed when the UE moves with a high speed, the extended CP can be used to further reduce inter-symbol interference.

Since each slot consists of 7 OFDM symbols when a normal CP is used, one subframe includes 14 OFDM symbols. At this time, the first maximum 3 OFDM symbols of each subframe are allocated to the physical downlink control channel (PDCCH) and the remaining OFDM symbols are allocated to the physical downlink shared channel (PDSCH).

FIG. 1(b) illustrates a type 2 radio frame. The type 2 radio frame consists of two half frames, and each half frame consists of 5 subframes, and each subframe consists of two slots. Among the 5 subframes, a special subframe consists of a downlink pilot time slot (DwPTS), a guard period (GP), and an uplink pilot time slot (UpPTS). The DwPTS is used for the UE to carry out the initial cell search, synchronization, and channel estimation. The UpPTS is used for the eNB to carry out channel estimation and uplink transmission synchronization with the UE. The GP is a period intended for removing interference generated during uplink transmission due to multi-path delay of a downlink signal between uplink and downlink transmission.

The structure of a radio frame described above is just an example, and the number of subframes included within one radio frame, the number of slots included within one subframe, and the number of symbols included within one slot can be varied in many ways.

Figure 2:
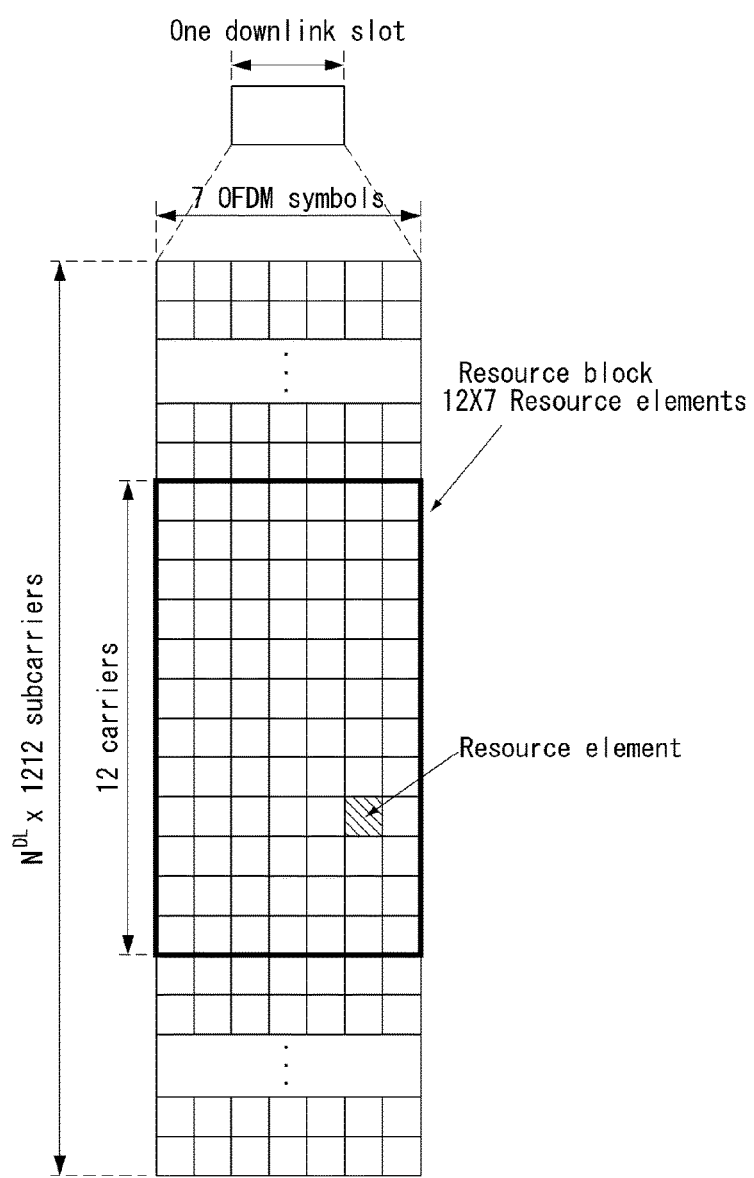
FIG. 2 illustrates one example of a resource grid of one downlink slot.

FIG. 2 illustrates one example of a resource grid of one downlink slot.

With reference to FIG. 2, one downlink slot includes a plurality of OFDM symbols in the time domain. Each downlink slot includes 7 OFDM symbols, and each resource block includes 12 subcarriers in the frequency domain. However, the present invention is not limited to the illustrative configuration.

Each element of resource grids is called a resource element, and a resource block includes 12×7 resource elements. Each resource element in the resource grids can be identified by an index pair (k, l) within a slot. Here, k (k=0, . . . , NRB×12-1) stands for a subcarrier index in the frequency domain while l (l=0, . . . , 6) an OFDM symbol index in the time domain. The number NRB of resource blocks included in a downlink slot is dependent on downlink transmission bandwidth. The structure of an uplink slot can be the same as that of the downlink slot.

Figure 3:
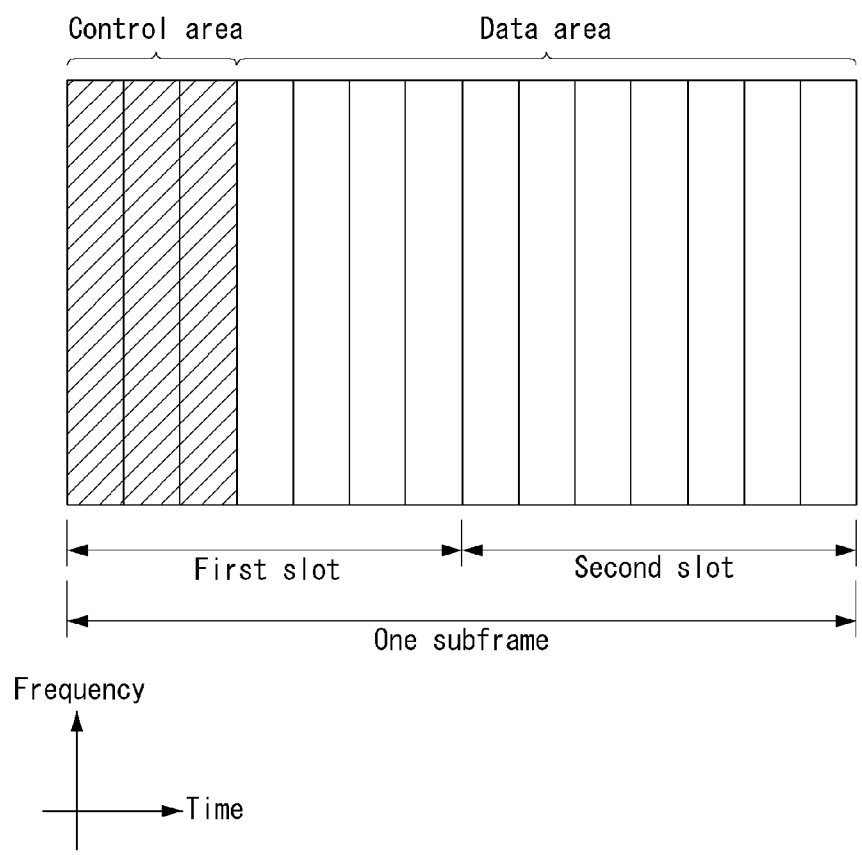
FIG. 3 illustrates one example of a downlink subframe structure.

FIG. 3 illustrates a downlink subframe structure.

With reference to FIG. 3, in the first slot within a subframe, the first maximum three OFDM symbols make up a control region to which control channels are allocated, and the remaining OFDM symbols form a data region to which a PDSCH is allocated. PCFICH, PDCCH, and PHICH are downlink control channels.

The PCFICH is transmitted from the first OFDM symbol of a subframe and carries information about the number (namely, size of the control region) of OFDM symbols used for transmission of control channels within a subframe. The PHICH is a response channel with respect to an uplink and carries a ACK/NACK signal with respect to HARQ. The control information transmitted through the PDCCH is called downlink control information (DCI). The DCI includes uplink resource allocation information, downlink resource allocation information, or uplink transmission (Tx) power control commands for an arbitrary UE group.

An eNB determines the PDCCH format according to Downlink Control Information (DCI) to be sent to a UE and adds a Cyclic Redundancy Check (CRC) to the control information. The CRC is masked with a unique identifier depending on an owner of the PDCCH or intended use of the PDCCH, which is called a Radio Network Temporary Identifier (RNTI). In the case of a PDCCH intended for a particular UE, a unique identifier for the UE, for example, Cell-RNTI (C-RNTI) can be masked with the CRC. Similarly, the CRC can be masked with a paging identifier, for example, Paging-RNTI (P-RNTI) in the case of a PDCCH intended for a paging message. The CRC can be masked with a system information identifier, for example, System Information-RNTI (SI-RNTI) in the case of a PDCCH intended for system information block. The CRC can be masked with a Random Access-RNTI (RA-RNTI) to designate a random access response in response to transmission of a random access preamble of the UE.

Figure 4:
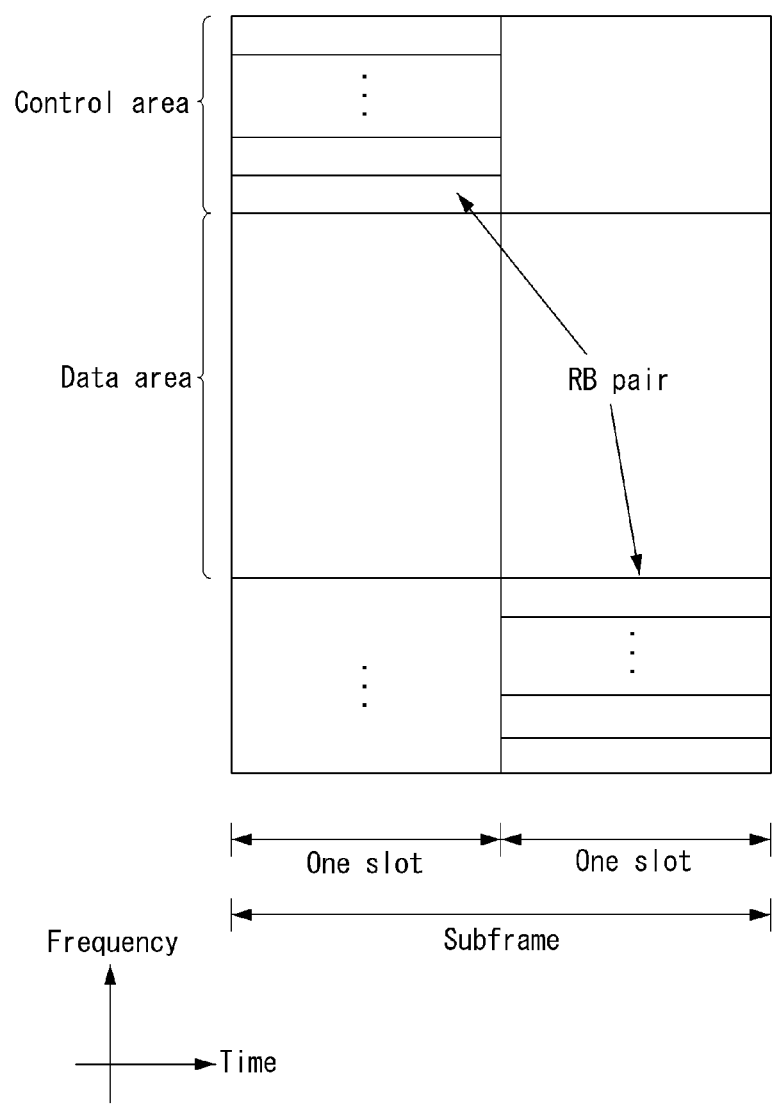
FIG. 4 illustrates one example of a uplink subframe structure.

FIG. 4 illustrates a uplink subframe structure.

With reference to FIG. 4, an uplink subframe is divided into a control region and a data region in the frequency domain. A PUCCH which carries uplink control information is allocated to the control region. A PUSCH which carries data is allocated to the data region. If an upper layer commands, the UE can support the PUSCH and the PUCCH at the same time. A resource block pair is allocated within a subframe for the PUCCH of each UE. The resource blocks belonging to a resource block pair allocated to the PUCCH occupy different subcarriers at each of two slots based on a slot boundary. In this case, the resource block pair allocated to the PUCCH is said to perform frequency hopping at slot boundaries.

The following describe system information.

The system information includes essential information required for a UE to connect to an eNB. Therefore, a UE has to receive the whole system information before connecting to an eNB and always maintain the system information to be up-to-date. And since the system information has to be known to all of the UEs within one cell, the eNB periodically transmits the system information.

The system information is divided into a Master Information Block (MIB), Scheduling Block (SB), and System Information Block (SIB). The MIB informs a UE of physical configuration of the corresponding cell, for example bandwidth. The SB carries informs about transmission information of SIBs, for example transmission period. An SIB is a set of system information associated with each other. For example, an SIB may include only the information of neighboring cells while another SIB may include only the information of a uplink radio channel used by the UE.

Figure 5:
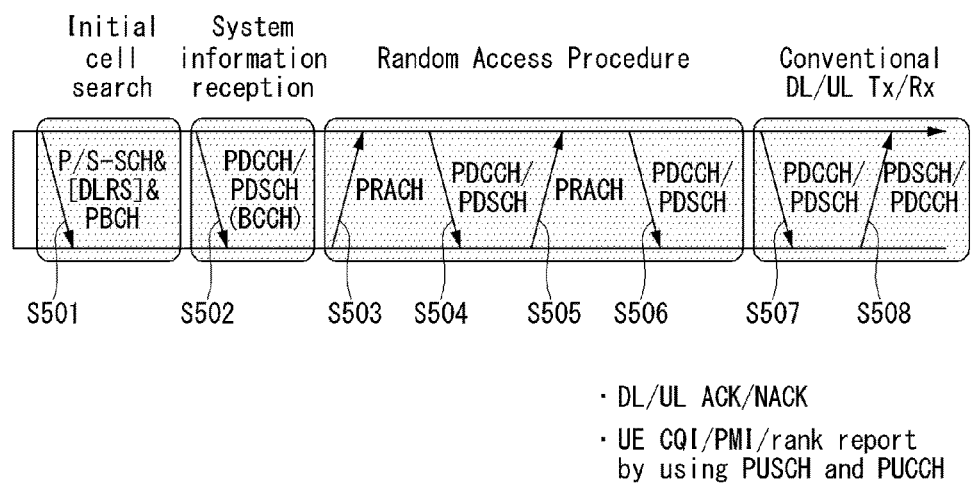
FIG. 5 illustrates physical channels used in the 3GPP LTE(-A) system and a conventional method for transmitting a signal.

FIG. 5 illustrates physical channels used in the 3GPP LTE-A system and a conventional method for transmitting a signal using the physical channels.

A UE, which may have been powered on again from the power-off state or may have newly entered a cell, carries out the initial cell search task such as synchronizing itself with an eNB in the S501 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S302 step to obtain more specific system information S502.

Next, the UE may carry out a random access procedure such as the steps of S503 to S506 to complete a connection process to the eNB. To this purpose, the UE transmits a preamble S503 through a physical random access channel (PRACH) and receives a response message in response to the preamble through a PDSCH corresponding to the PRACH S504. In the case of contention-based random access, the UE may carry out a contention resolution procedure including transmission of an additional PRACH signal S505 and reception of a PDCCH signal and the PDSCH signal corresponding to the PDCCH signal S506.

Afterwards, the UE which has carried out the procedure above may carry out reception S507 of the PDCCH signal and/or PDSCH signal and transmission S508 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Random Access Procedure (RACH)

FIGS. 6(a) and 6(b) illustrate one example of a random access procedure in the LTE system.

The UE carries out the random access procedure (RACH) at the time of the initial connection in the RRC IDLE state, initial connection after radio link failure, handover requiring the RACH, and generation of uplink or downlink data requiring the RACH while in the RRC_CONNECTED state. Part of RRC messages such as the RRC connection request message, cell update message, and UTRAN Registration Area (URA) update message are also transmitted through the random access procedure. Logical channels such as Common Control Channel (CCCH), Dedicated Control Channel (DCCH), and Dedicated Traffic Channel (DTCH) can be mapped to a transmission channel RACH. A transmission channel RACH is mapped to a physical channel such as the Physical Random Access Channel (PRACH).

If the UE's MAC layer commands the UE's physical layer to start PRACH transmission, the UE's physical layer first selects one access slot and one signature to transmit the PRACH preamble to the uplink. Two types of random access procedure are defined: contention based and non-contention based random access procedure.

FIG. 6(a) illustrates one example of a contention based random access procedure, while FIG. 6(b) illustrates one example of a non-contention based random access procedure.

First, contention based random access procedure will be described with reference to FIG. 6(a).

The UE receives information about random access from the eNB through system information and stores the received information. Afterwards, in case random access is required, the UE transmits a random access preamble (which is also called a message 1) to the base station S601.

If the eNB receives a random access preamble from the UE, the eNB transmits a random access response (which is also called a message 2) to the UE S602. To be specific, downlink scheduling information with respect to the random access response message is CRC masked with a Random Access-Radio Network Temporary Identifier (RA-RNTI) and transmitted on the L1 or L2 control channel (PDCCH). The UE, having receiving a downlink scheduling signal masked with the RA-RNTI, receives a random access response message from a Physical Downlink Shared Channel (PDSCH) and decodes the received random access response message. Afterwards, the UE checks the random access response message whether it contains random access response information directed to the UE.

Existence of random access response information directed to the UE can be determined by checking a Random Access Preamble ID (RAID) with respect to a preamble that the UE has transmitted.

The random access response information includes Timing Alignment (TA) representing timing offset information for synchronization, allocation information of radio resources used for uplink, and a temporary C-RNTI for UE identification.

In case random access response information is received, the UE carries out uplink transmission (which is also called a message 3) to a uplink Shared Channel (SCH) according to the radio resource allocation information included in the response information S603. At this time, uplink transmission may be expressed as scheduled transmission.

After receiving the uplink transmission from the UE, the eNB transmits a message for contention resolution (which is also called a message 4) to the UE through a Downlink Shared Channel (DL-SCH) S604.

Next, non-contention based random access procedure will be described with reference to FIG. 6(b).

Before the UE transmits a random access preamble, the eNB allocates a non-contention based random access preamble to the UE S611.

The non-contention based random access preamble can be allocated through a handover command or dedicated signaling such as a PDCCH. In case a non-contention based random access preamble is allocated to the UE, the UE transmits the allocated non-contention based random access preamble to the eNB S612.

Afterwards, the eNB is able to transmit a random access response (which is also called a message 2) to the UE similarly to the S2002 step of the contention based random access procedure S613.

Although HARQ has not been applied to the random access response during the random access procedure above, the HARQ can be applied to uplink transmission with respect to the random access response or a message for contention resolution. Therefore, the UE doesn't necessarily have to transmit ACK or NACK with respect to the random access response.

eNB Scheduling-Based UL Resource Allocation Procedure

FIGS. 7a and 7b illustrate one example of an eNB scheduling-based uplink resource allocation procedure in the LTE system.

FIG. 7a illustrates one example of a 5-step uplink resource allocation procedure, and FIG. 7b illustrates one example of a 3-step uplink resource allocation procedure.

FIG. 7a illustrates a uplink resource allocation procedure for actual data when uplink radio resources for Buffer Status Reporting (BSR) are not allocated to a UE, and FIG. 7b illustrates a uplink resource allocation procedure for actual data when uplink radio resources for BSR are allocated to the UE.

In the LTE system, for efficient use of uplink radio resources, an eNB needs to know which data and how much of the data to transmit to each UE.

Therefore, the UE transmits to the eNB the information about uplink data that the UE attempts to transmit directly, and the eNB allocates uplink resources to the corresponding UE in accordance to the UE's transmission.

In this case, the information about uplink data that the UE transmits to the eNB is the amount of uplink data stored in the UE's buffer, which is called Buffer Status Report (BSR). When radio resources on the PUSCH are allocated during a current TTI and a reporting event is triggered, the UE transmits the BSR by using the MAC control element.

First, the 5-step uplink resource allocation procedure will be described with reference to FIG. 7a.

The UE transmits a uplink scheduling request to the eNB to receive PUSCH resources S701.

The scheduling request is used for the UE to request the eNB to allocate the PUSCH resources for uplink transmission in case radio resources are not scheduled on the PUSCH during a current TTI although a reporting event has occurred. In other words, when a regular BSR has been triggered but uplink radio resources for transmitting the BSR to the eNB are not allocated to the UE, the UE transmits the SR through the PUCCH.

Depending on whether the PUCCH resources for SR have been configured, the UE may transmit the SR through the PUCCH or starts a random access procedure. More specifically, the PUCCH resources through the SR can be transmitted are set up by an upper layer (for example, the RRC layer) in a UE-specific manner, and the SR configuration include SR periodicity and SR sub-frame offset information.

If the UE receives from the eNB an UL grant with respect to the PUSCH resources for BSR transmission S703, the UE transmits the regular BSR to the eNB, which has been triggered through allocated PUSCH resources S705.

By using the BSR, the eNB checks the amount of data for the UE to actually transmit through uplink transmission and transmits to the UE an UL grant with respect to the PUSCH resources for transmission of actual data S707. The UE, which has received the UL grant meant for transmission of actual data, transmits to the eNB actual uplink data through the allocated PUSCH resources S709.

FIG. 7(b) illustrates the case where the PUSCH resources for BSR transmission have already been allocated to the UE; the US transmits the BSR through the allocated PUSCH resources and transmits a scheduling request to the eNB along with the BSR transmission S711. Next, by using the BSR, the eNB check the amount of data that the UE actually transmits through uplink transmission and transmits to the UE an UL grant with respect to the PUSCH resources for transmission of actual data S713. The UE, which has received an UL grant for transmission of actual data, transmits actual uplink data to the eNB through the allocated PUSCH resources S715.

Reference Signal (RS)

Since packets are transmitted through a radio channel in a wireless communication system, signal distortion can occur during the transmission. In order for a receiver to get a correct signal, distortion in a received signal should be corrected by using channel information. A common method for estimating channel information transmits a signal known to both sides of the transmitter and the receiver through the channel and uses degree of distortion measured when the signal is received through the channel to estimate the channel information. The signal above is called a pilot signal or a reference signal.

When multiple antennas are used for data transmission and reception, a signal can be received correctly only if the channel condition between each transmitting antenna and receiving antenna is known. Therefore, separate reference signals are needed for the respective transmitting antennas, more specifically, for the respective antenna ports.

Reference signals can be divided into uplink reference signals and downlink reference signals. In the current LTE system, a uplink reference signal includes:

i) a DeModulation-Reference Signal (DM-RS) for channel estimation for coherent demodulation of the information transmitted through the PUSCH and the PUCCH; and ii) a Sounding Reference Signal (SRS) for the eNB to measure uplink channel quality in a different network frequency.

Meanwhile, a downlink reference signal includes:

i) a Cell-specific Reference Signal (CRS) shared by all of the UEs within a cell, ii) a UE-specific Reference Signal for a specific UE, iii) a DeModulation-Reference Signal (DM-RS) transmitted for coherent demodulation in case the PDSCH is transmitted, iv) a Channel State Information-Reference Signal (CSI-RS) for transmitting Channel State Information (CSI) in case a downlink DMRS is transmitted, v) a Multimedia Broadcast Single Frequency Network (MBSFN) reference signal transmitted for coherent modulation of a signal transmitted in an MBSFN mode, and vi) a positioning reference signal used for estimating geographical position information of the UE.

A reference signal can be classified largely into two types according to its purpose: a reference signal to obtain channel information and a reference signal used for data demodulation. Since the former is used by the UE to obtain downlink channel information, it should be transmitted as a broadband signal, and even a UE which does not receive downlink data at a specific subframe has to receive the reference signal. Moreover, this reference signal is also used in a situation such as handover. The reference signal used for data demodulation is sent together with the corresponding resources when the eNB performs downlink transmission; the UE can demodulate data by receiving the corresponding reference signal and performing channel measurement. This reference signal has to be transmitted to a region to which the data are transmitted.

The purposes of the CRS are twofold: channel information acquisition and data demodulation. The UE-specific reference signal is used only for data demodulation. The CRS is transmitted for each subframe with respect to a broadband signal, and a reference signal with respect to a maximum of four antenna ports is transmitted according to the number of transmission antennas of the eNB.

For example, in case the number of transmitting antennas of the eNB is 2, a CRS with respect to the 0-th and the 1st antenna port is transmitted while a CRS with respect to the 0-th to the 3rd antenna port is transmitted in case the number of transmitting antennas is 4.

D2D Communication

For most cases, D2D communication specifically refers to machine-to-machine communication, but D2D communication according to the present invention refers not only to the communication involving simple devices equipped with a communication function but also to the communication among various types of devices equipped with a communication function such as smartphones or personal computers.

Figure 8:
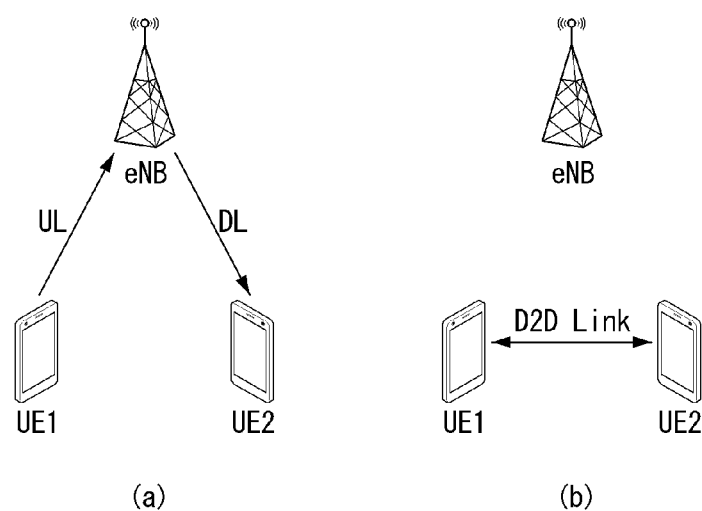
FIG. 8 illustrates the concept of D2D communication.

FIG. 8 illustrates the concept of D2D communication.

FIG. 8a illustrates a conventional communication scheme involving an eNV, where UE1 transmits data to the eNB through a uplink, and the eNB transmits data to UE2 through a downlink. Such a communication scheme can be called indirect communication through an eNV. Indirect communication can include a Un link defined in the existing wireless communication systems (which is a link between eNBs or a link between an eNV and a repeater; and can be called a backhaul link) and/or a Uu link (which is a link between an eNB and a UE or a link between a repeater and a UE; and can be called an access link).

FIG. 8b is an example of D2D communication illustrating a UE-to-UE communication scheme, where data exchange between UEs can be performed without involving an eNB. Such a communication scheme can be called a direct communication scheme between devices. A link between devices according to the direct communication scheme can be defined as a D2D link (or Ud link). D2D direct communication exhibits a reduced latency compared with the existing indirect communication involving an eNB and consumes a less amount of radio resources.

In what follows, although descriptions of D2D communication are given based on an example using direct communication between two devices for the sake of clarity, the technical scope of the present invention is not limited to the example, but the same technical principles of the present invention can be applied to the D2D communication among two or more devices.

D2D Resource Configuration

Since D2D communication reuses resources of an existing wireless communication network (for example, 3GPP LTE or 3GPP LTE-A), it is not allowed to generate interference or disturbance on the existing wireless communication network. In other words, although actual data communication between devices may not involve an eNB, resources used for D2D communication has to be configured so that they can be separated from the resources for the existing wireless communication (namely indirect communication through the eNB).

More specifically, the operation performing D2D direction communication and the operation performing indirect communication through the eNB may interfere with each other. For example, a UE may use a downlink carrier (or downlink frequency band) and a uplink carrier (or uplink frequency band) distinguished from each other while a UE equipped with a half-duplex function can have both of a reception and a transmission function but cannot perform the functions at the same time. Such a UE as above is unable to perform the reception function while simultaneously performing transmission to a D2D correspondent on the same carrier. Similarly, the UE is unable to perform receiving data from the D2D correspondent on the same carrier while simultaneously performing the transmission function.

Therefore, taking into account the limitation that the UE is unable to perform the full-duplex function, it is assumed that the operation performing D2D direction communication and the operation performing indirect communication through the eNB interfere with each other. As described above, in a situation where a half-duplex UE is used, setting up resources for D2D link communication separately from the resources for Uu/Un link communication can be considered as a means of using D2D direction communication and indirect communication through an eNB together.

For example, TDM can be applied to the D2D link communication and Uu/Un link communication. In other words, during the time period for D2D link communication (for example, subframe), communication between the eNB and the UE (for example, PDSCH or PUSCH transmission and reception) may not be scheduled. Similarly, time resources for D2D link communication may be set up beforehand so that D2D link communication can be performed only with the resources dedicated to D2D communication. Also, time resources that cannot be utilized for D2D link communication may be set up beforehand so that D2D link communication can be performed with other time resources.

For the sake of clarity, the example above describes D2D link communication based on the D2D resources in the time domain, but resources which allow and/or prohibit D2D link communication may be set up in the frequency domain and/or spatial domain (for example, antenna port or layer domain). For example, a particular resource block can be configured as a frequency resource by which D2D link communication is performed. Similarly it can be so configured that D2D link communication can be performed in a specific time period based on specific frequency resources. For example, a D2D-dedicated resource block can be set up with a period of 8 ms, and D2D communication may be scheduled to be performed only within the resource area and at the specific time period.

The UE can implicitly determine information about the resources for which D2D link communication is prohibited. For example, the UE can determine that the time/frequency/spatial resources which receive system information, synchronization signal, control channel, reference signal, and so on correspond to the resource area which prohibits D2D link communication. Similarly, information about the resources which allow and/or prohibit D2D link communication may be indicated explicitly to the UE through signaling from a network.

For example, a period, resources, and retransmission method for D2D link communication can be signaled to a UE which requests D2D link communication. Accordingly, the corresponding UE can be made to perform D2D link communication with predetermined (time/frequency/spatial) resources. To this end, a method for configuration signaling intended for D2D link communication can be defined. For example, the period and offset of a subframe that can be used for D2D link communication can be specified for a UE through upper layer signaling, and activation/release of D2D link communication can be indicated dynamically through a control channel. The control information indicated dynamically can include information about an RB and an MCS allocated for D2D link communication. Accordingly, D2D resource configuration can be carried out in a semi-static manner similar to resource configuration for an SPS service.

D2D Link Transmission and Uu/Un Link Transmission

The carrier (or frequency band) used for D2D link communication is either a uplink carrier or a downlink carrier or both of the uplink and downlink carriers can be used for D2D link communication. Also, in a system supporting carrier aggregation, carriers for D2D link communication can be set up separately from the carriers for Uu/Un link communication.

A downlink carrier used for communication between an eNB and a UE carries essential signal/information such as a broadcast signal, control channel, and reference signal; and thus it is more difficult to use the downlink carrier for D2D link communication than the uplink carrier which does not. Therefore, it can be assumed that uplink carriers are used for D2D link communication. At this time, an operating scenario may be worthy of consideration that transmission from the UE to the eNB through the Uu/Un link and transmission from the UE to another UE through a D2D link are performed simultaneously or at different times.

In case transmission through a Uu/Un link and transmission through a D2D link are not allowed simultaneously in one UE, transmission can be performed individually on the resources allowed according to the D2D resource configuration described above.

Meanwhile, in case transmission through a Uu/Un link and transmission through a D2D link are allowed simultaneously in one UE, there can be times when the PUCCH on the Uu/Un link from the UE to the eNB (in what follows, it is called a macro PUCCH) and the PUCCH on the D2D link from the UE to another UE (in what follows, it is called a D2D PUCCH) are transmitted from the same subframe. In most cases, since transmission power of a macro PUCCH is much larger than the transmission power of the D2D PUCCH, simultaneous transmission of the macro PUCCH and the D2D PUCCH can cause a strong interference on the D2D PUCCH transmission.

The eNB can configure macro PUCCH transmission power for the UE, but the UE can determine D2D PUCCH transmission power autonomously by taking into account the path loss of a D2D link. Therefore, the UE which performs D2D link communication proposes a method for providing feedback information about the D2D PUCCH transmission power configuration information to the eNB. Accordingly, the eNB can configure the macro PUCCH transmission power by taking into account the D2D PUCCH transmission power (for example, to reduce interference on the D2D PUCCH).

Also, the D2D PUCCH transmission power configuration information that the D2D UE provides as feedback information may be used by the operation which prohibits different types of PUCCHs from being transmitted simultaneously from the same subframe. Even if the UE is capable of simultaneously transmitting the macro PUCCH and the D2D PUCCH, D2D link communication may not be performed correctly in case interference on the D2D PUCCH is large as described above.

Therefore, it may be preferred that only one type of PUCCH is transmitted from one subframe. To this end, by taking into account the macro PUCCH transmission power configuration information and the D2D PUCCH transmission power configuration information together, the eNB can assign transmission priorities to the macro PUCCH and the D2D PUCCH respectively and inform the UE of the transmission priorities. Also, by taking into account the D2D PUCCH transmission power information of the D2D UE and the macro PUCCH transmission power information received from the eNB, the D2D UE may determine which of the D2D PUCCH and the macro PUCCH to transmit first. Accordingly, in a situation where different types of PUCCHs are transmitted simultaneously, the UE can operate to transmit the PUCCH of a higher priority, thereby reducing interference between the D2D link and the Uu/Un link.

The example above according to the present invention is not limited only to the macro PUCCH transmission and/or D2D PUCCH transmission, but the same technical principles of the present invention can be applied to uplink transmission power control of a UE which performs D2D communication.

Transmission and Reception of D2D Communication-Related Information

Figure 9:
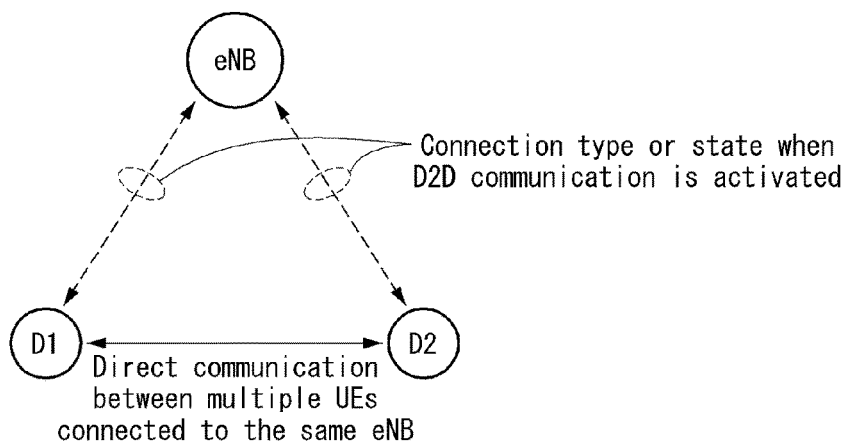
FIG. 9 illustrates an example where two devices connected to the same base station communicate directly with each other.

FIG. 9 illustrates an example where two devices (D1 and D2) connected to the same eNB communicate directly with each other.

In the example of FIG. 9, when D2D communication is activated, D1 and D2 may or may not retain the respective connections to the eNB. In the example of FIG. 9, it is assumed that D1 and D2 are located within coverage of the eNB even if connection of D1 or D2 to the eNB is not retained.

In case devices participating in D2D communication are connected to the same eNB, the D2D related configuration described above (for example, D2D resource configuration and configuration of a relationship between Uu/Un link transmission and D2D link transmission) is determined by the same entity, basic D2D communication thus can be performed by the signaling described above.

Also, D2D communication-related information for performing D2D communication in a proper manner can be transmitted and received between D2D devices (D1 and D2) and the eNB. For example, D2D communication-related information can be charging-related information. Although the eNB does not get involved in the D2D link communication itself, D2D communication is performed by using the resources for existing wireless networks, and thus operators who provide wireless networks can change D2D link communication. To support charging, information including activation (or starting) time of D2D communication, release (or ending) time of D2D communication, time period for which D2D communication is maintained, size of frequency resources used for D2D communication, and information about the amount of transmitted and received data can be provided to the eNB by the D2D device. To this purpose, physical layer signaling and/or upper layer signaling can be defined and utilized.

Figure 10:
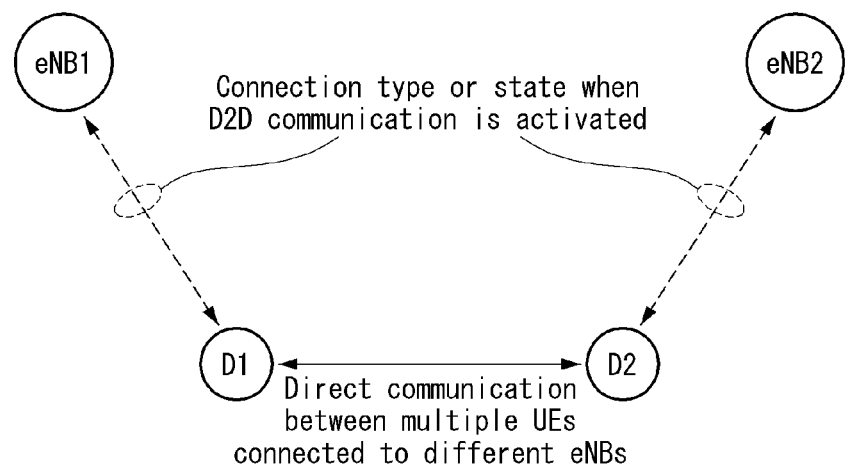
FIG. 10 illustrates an example where two devices connected to different base stations communicate directly with each other.

FIG. 10 illustrates an example where two devices (D1 and D2) connected to different eNBs communicate directly with each other.

In the example of FIG. 10, if D2D communication is activated, D1 may be connected to eNB1, and D2 to eNB2, but the connections may not be retained. In the example of FIG. 10, it is assumed that even if one or more of the connection between eNB1 and D1; and the connection between eNB2 and D2 are not retained, the respective devices are located within the coverage of the corresponding eNBs.

In case devices participating in D2D communication are connected to the respective eNBs, the D2D-related configuration described above (for example, D2D resource configuration and configuration of a relationship between Uu/Un link transmission and D2D link transmission) is determined by separate entities, D2D communication-related information thus needs to be exchanged in addition to the signaling described above.

For example, the information such as a resource area and MCS for D2D link communication that are signaled to D1 by eNB1 has to be provided equally to D2 which performs communication directly with D1. (At this time, actual information about D1 may be the same as the information about D2, but in case cell-specific parameters are different for the cells in which the respective devices are located, representation of the corresponding information may differ from each other.)

For example, eNB1 can inform eNB2 (eventually D2) of D2D communication-related information configured with respect to D1. To this purpose, a predetermined signaling method can be applied. For example, in case a PDCCH order which commands the UE to initiate the random access procedure is modified so that the fields within a DCI format are set to predetermined, specific values, the corresponding control information can be made to be signaling for providing D2D-related information from eNB1 to eNB2 (or D2). Similarly, in case it is determined that D2D communication is activated through a handshaking procedure between eNBs, a signaling method which exchanges D2D communication-related information required by each eNB can be applied.

In what follows, resource scheduling, resource allocation, and procedures related thereto in D2D direction communication according to the present invention will be described in detail.

In particular, a method for transmitting a message based on broadcast or groupcast is described mainly for such situations as inside network coverage, outside network coverage, and partial network coverage.

Signal Format for D2D Communication

Direct communication between D2D devices are supported in the UL frequency band or UL subframes in which LTE UL channels are operated. Most of UT, channels or signals of the LTE system can be reused for physical channels or signals for D2D communication.

For example, the Physical Uplink Shared Channel (PUSCH) used in the LTE(-A) system and functional blocks of the PUSCH can be reused for D2D message transmission and reception for unicast, groupcast, and broadcast.

In the LTE system, UL DM RS structure, resource mapping, and related parameters are also used for D2D communication by default.

Also, D2D resource block, resource allocation, and resource mapping may be identical to the resource block, resource allocation, and resource mapping in the LTE system.

In other words, most of resources used in the LTE(-A) system can be reused for D2D communication. However, one of differences between the LTE system and D2D communication is that in the case of D2D communication, simultaneous transmission and reception are not supported in the UL frequency band. Therefore, D2D communication requires transient time (or interval) for switching from transmission mode to reception mode (Tx-to-Rx) or vice versa.

Referring to the switching transient time from transmission mode to reception mode and/or from reception mode to transmission mode in the LTE system, transient time (or guard interval) from transmission mode to reception mode and/or reception mode to transmission mode in the D2D communication according to the present invention will be described in detail with reference to FIGS. 11 and 12.

Figure 11:
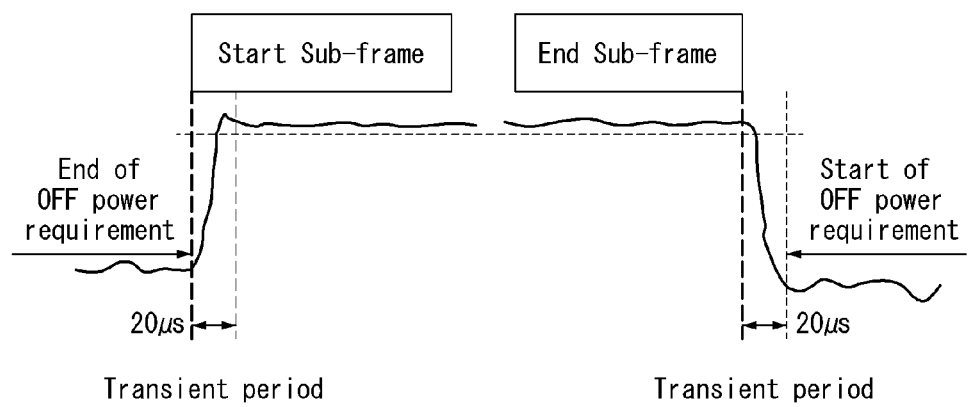
FIG. 11 illustrates one example of an ON/OFF time mask of a terminal defined in the LTE(-A) system.

FIG. 11 illustrates one example of an ON/OFF time mask of a generic UE.

The example of FIG. 11 illustrates time periods required for the UE to switch from transmission operation (or mode) to reception operation or from reception operation to transmission operation.

It can be known from the figure that the transient period (or time) from transmission mode to reception mode or from reception mode to transient mode is defined as 20 µs.

The transient period of 20 µs defined in the LTE system corresponds to 0.28 SC-FDMA symbol interval in the normal Cyclic Prefix (CP).

Figure 12:
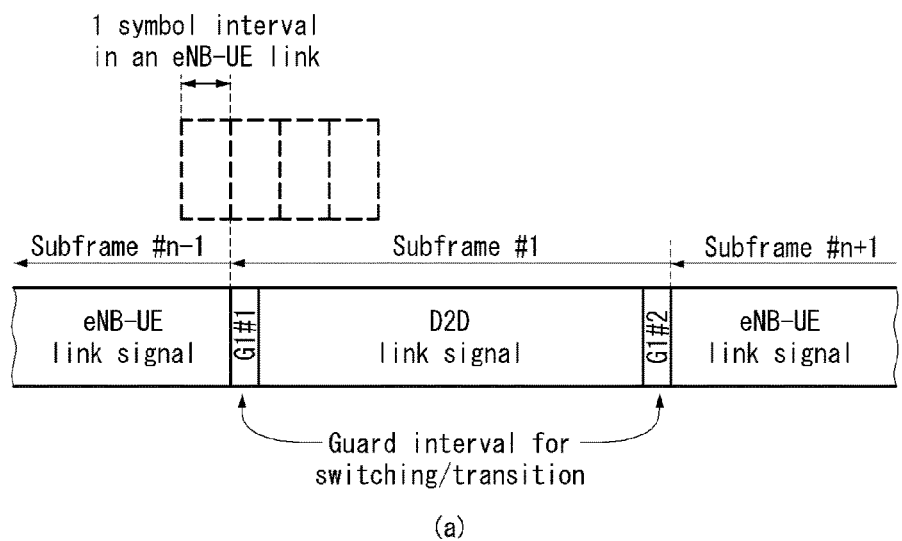
FIG. 12 illustrates one example of a transient period of D2D communication according to the present invention.
Figure 12:
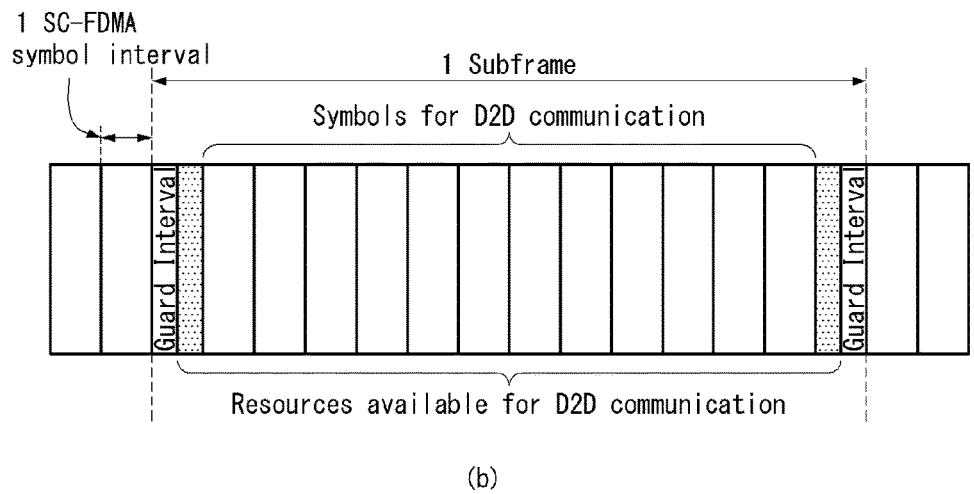

FIG. 12 illustrates one example of a transient period of D2D communication according to the present invention.

As shown in FIGS. 12(a) and 12(b), for switching from transmission mode to reception mode or from reception mode to transmission mode in D2D communication, part of the SC-FDMA symbol interval or SC-FDMA 1 symbol is reserved as a transient period, namely a Guard Interval (GI) in which transition is allowed.

In other words, the GI may be reserved in units of SC-FDMA symbols, and in this case, it is preferred that SC-FDMA 1 symbol is reserved as the GI.

With reference to FIG. 12a, GI#1 and GI#2 represent the respective GIs, and GI#1 represents a GI for switching from transmission mode to reception mode while GI#2 for switching from reception mode to transmission mode.

Each of the GI#1 and GI#2 can correspond to 1 SC-FDMA symbol interval. However, the aforementioned configuration is not limited to a current example and can have various values according to implementation.

In FIG. 12(a), GIs are disposed in the front and rear of a D2D link signal interval (Subframe #n). It should be noted, however, that the GI may be disposed at least in either of the front and the rear of the D2D link signal interval.

FIG. 12(b) illustrates one example of a PUSCH format modified for D2D link (or communication), where the modified PUSCH format includes a D2D link signal interval and GIs.

In D2D communication, part of the SC-FDMA symbol interval has to be reserved for the transient period, namely the GI for switching from transmission mode to reception mode and/or from reception mode to transmission mode.

In what follows, described will be a method for performing D2D communication under the condition of inside network coverage, outside network coverage, and partial network coverage according to the present invention.

Inside network coverage refers to the situation where D2D communication is performed through an eNB's control within specific network coverage. The specific network coverage can be supported by the eNB.

Outside network coverage refers to the situation where D2D UEs perform D2D communication without involving the eNB's control Partial network coverage refers to the situation where D2D communication is performed when some of D2D UEs are located within specific network coverage while other D2D UEs are located outside the specific network coverage.

In(Side) Network Coverage

Radio resources under the inside network coverage scheme can be controlled completely by the eNB scheduler across the whole time span.

In order for D2D UEs staying in an RRC idle state to initiate D2D communication, a random access preamble can be transmitted. The random access preamble is used to request a scheduling grant for setting up an RRC connection.

After the RACH procedure, the D2D UE in an RRC connected state can transmit a scheduling request for performing D2D communication to the respective peer D2D UEs or a group of D2D UEs. Specific descriptions related to the RACH procedure and UL scheduling are given with reference to FIGS. 6 and 7.

To perform the scheduling procedure, a D2D receiving UE always has to be awake to listen to a signal transmitted from a D2D transmitting UE. In other words, the D2D receiving UE always stays in the RRC connected mode, unnecessarily consuming a large amount of power.

Therefore, in case a D2D receiving UE is in an idle state and is allowed to participate in D2D reception while in the idle state, the D2D receiving UE doesn't necessarily have to consume power.

In what follows, a method for a D2D UE in the idle state to perform D2D communication according to the present invention will be described in detail with reference to FIG. 13.

In order for a D2D UE in the idle state to transmit or receive a D2D signal, the D2D UE first transmits a particular signal request to request allocation of radio resources to the eNB S1310.

At this time, the particular signal request is denoted as a first message.

Figure 13:
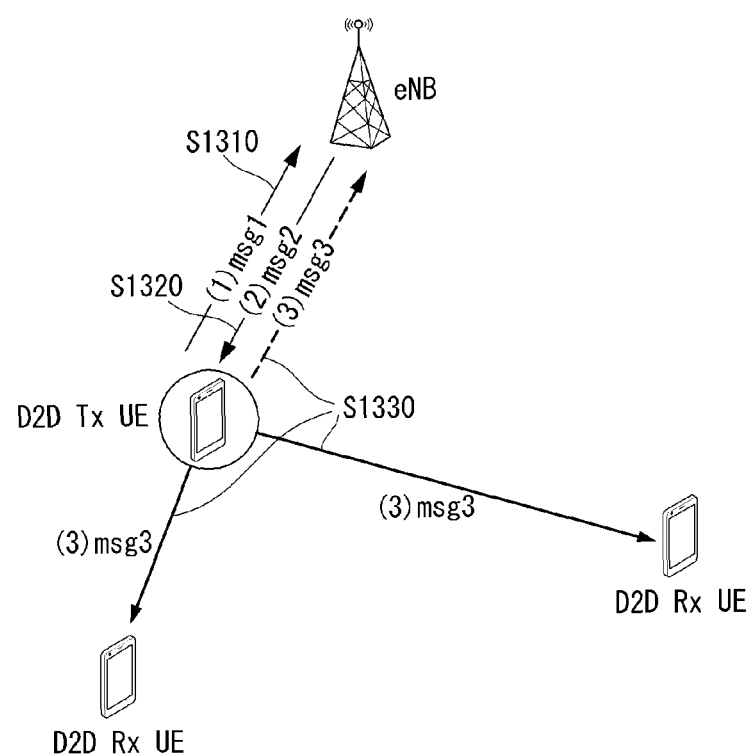
FIG. 13 illustrates one example of a method for a D2D terminal in an idle state to perform D2D communication according to the present invention.

In case the method described in FIG. 13 utilizes the RACH procedure, the particular signal request, namely the first message can correspond to the random access preamble (message 1) of the RACH procedure.

Also, in case the method described in FIG. 13 utilizes a UL resource allocation procedure, the particular signal request, namely the first message can be a UL scheduling request.

Next, the D2D UE receives radio resource allocation information (for example, scheduling information) from the eNB S1320. In what follows, the message related to the radio resource allocation information will be denoted as a second message.

The second message can be a random access response of the RACH procedure or a UL grant of the UL resource allocation procedure.

Finally, the D2D UE transmits its transmission signal through a radio resource area allocated by the eNB in a unicast, groupcast, or broadcast manner S1330. At this time, a signal transmitted through a resource area to which the D2D UE is allocated will be denoted as a third message. The third message can be uplink or downlink data.

The S1310 to S1320 steps are similar to the S601 and S602 steps of the RACH procedure (preamble, PAR) described with reference to FIG. 6(a), but the S1330 step is slightly different from the S603 step of FIG. 6(a).

In other words, the message 3 (scheduled transmission) in the RACH procedure is transmitted only to a targeted eNB, but in the S1330 step, the message 3 is transmitted to other intended D2D receiving UEs as well as the target eNB.

At this time, targeted (or intended) D2D receiving UEs refer to (1) all of the D2D UEs that can decode a broadcast signal when a message of the S1330 step is transmitted in a broadcast manner or (2) all of the D2Ds that belong to the corresponding group and at the same time, capable of decoding a groupcast signal when a message of the S1330 step is transmitted in a groupcast manner.

The message corresponding to the S1330 step is transmitted from the D2D (transmitting) UE to the eNB, and the eNB can provide an appropriate response such as ACK in case decoding is successful or NACK in case the eNB fails decoding to the D2D transmitting UE as a feedback signal.

At this time, (if needed) a HARQ retransmission procedure can be used additionally with respect to the feedback information.

Figure 14:
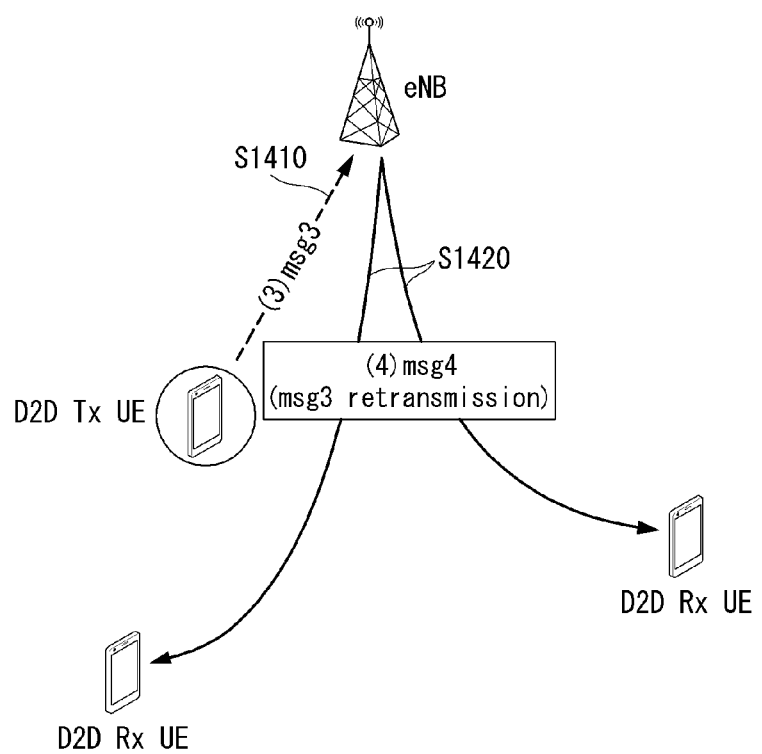
FIG. 14 illustrates another example of a method for a D2D terminal in an idle state to perform D2D communication according to the present invention.

FIG. 14 illustrates another example of a method for a D2D UE in an idle state to perform D2D communication according to the present invention.

FIG. 14 illustrates a method for transmitting a fourth message after a HARQ NACK is received from the eNB or other D2D receiving UEs in case the D2D transmitting UE fails to transmit the third message.

Since the procedure for the D2D transmitting UE to request radio resources and to receive the requested radio resources are the same as those described in FIG. 13, detailed descriptions about the corresponding procedure will be omitted.

As shown in FIG. 14, in case the eNB fails to receive the third message from the D2D transmitting UE, the eNB sends back NACK to the D2D transmitting.

At this time, the D2D transmitting UE can transmit the third message to the eNB and to the D2D receiving UEs as many times as a specific number (by a predetermined number of times) S1410.

If the eNB determines that it has failed to receive the third message, it can be interpreted the eNB have missed the third message transmitted from the D2D transmitting UE by a specific number of times at least once. As one example, in case the eNB fails to receive the first transmission of the third message transmitted from the D2D transmitting UE, the eNB determines to have failed to receive the third message. However, in order for the eNB to retransmit the third message to the D2D receiving UE, the eNB has to receive the third message transmitted from the D2D transmitting UE by a specific number of times at least once.

If the eNB determines to have failed to receive the third message, the eNB broadcasts the fourth message according to an appropriate timeline to D2D receiving UEs on behalf of the D2D transmitting UE S1420.

At this time, the fourth message can be the third message retransmitted.

As described above, if the fourth message is the retransmitted third message, the D2D transmitting UE transmits the third message corresponding to the S1330 step to the eNB by repeating the step by a predetermined number of times. This is intended so that the eNB can receive the third message from the D2D transmitting UE at least once.

Also, the reason why the eNB retransmits the third message to the D2D receiving UEs is that the signal transmission capability of the eNB is superior to that of the D2D transmitting UE (for all possible cases).

Figure 15:
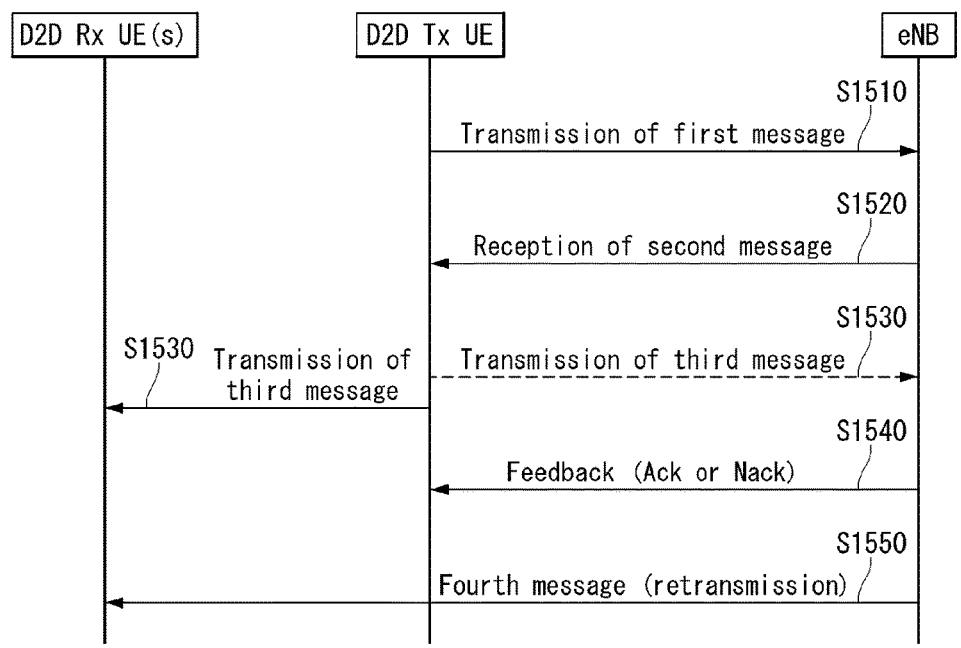
FIG. 15 is a flow diagram illustrating one example of a method for performing D2D communication of FIG. 14 according to the present invention.

FIG. 15 is a flow diagram illustrating one example of a method for performing D2D communication of FIG. 14 according to the present invention.

Since the S1510 and the S1520 step are the same as the S1310 and the S1320 step of FIG. 13, only the different part will be described.

After the S1520 step, the D2D transmitting UE transmits the third message to the eNB and the D2D receiving UEs S1530.

At this time, the D2D transmitting UE can transmit the third message repeatedly by a specific number of times (by a predetermined number of times or by a predefined number of times) to the eNB and the D2D receiving UEs.

Afterwards, if the eNB fails to receive the third message firstly transmitted from the D2D transmitting UE, the eNB transmits NACK message as feedback information to the D2D transmitting UE S1540.

If the eNB fails to receive the third message firstly transmitted, the eNB determines that the D2D receiving UEs have also failed to receive the third message.

Afterwards, the eNB transmits the fourth message to the D2D receiving UEs on behalf of the D2D transmitting UE S1550. As described above, the fourth message can correspond to the third message retransmitted to the D2D receiving UEs.

Figure 16:
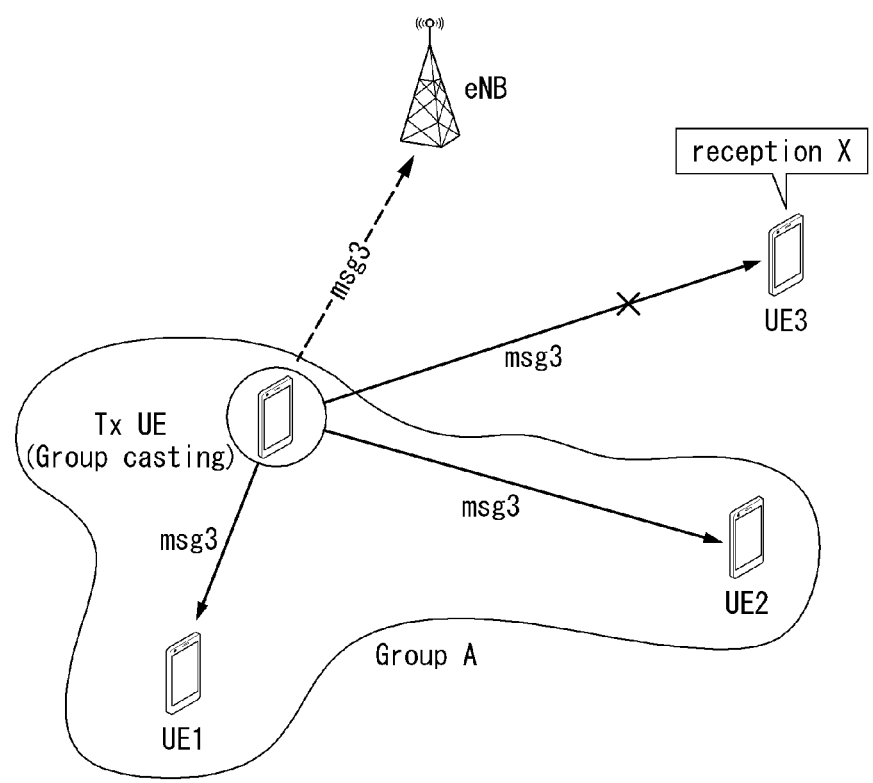
FIG. 16 illustrates another example of a method for performing D2D communication according to the present invention.

FIG. 16 illustrates another example of a method for performing D2D communication according to the present invention.

Different from the broadcast transmission method, the groupcast transmission method may utilize a retransmission procedure such as the HARQ operation to form a group and to manage the group and member UEs. In one example, the fourth message may be required as a response related to transmission of the third message of FIG. 15.

FIG. 16 illustrates one example of a specific group (Group #A) and groupcasting. UE 1 and UE2 are member UEs of the group, and UE 3 is not a member UE of the group.

Since the procedure for the D2D transmitting UE to request radio resources and to receive the requested radio resources are the same as those described in FIG. 13, detailed descriptions about the corresponding procedure will be omitted.

The D2D transmitting UE within the group groupcasts the third message to the eNB and/or D2D receiving UEs. At this time, the groupcast third message is not transmitted to UE3 not belonging to the group.

At this time, UE 1 and UE 2, member UEs of the group, transmit the fourth message to the D2D transmitting UE as a response to the third message received.

Figure 17:
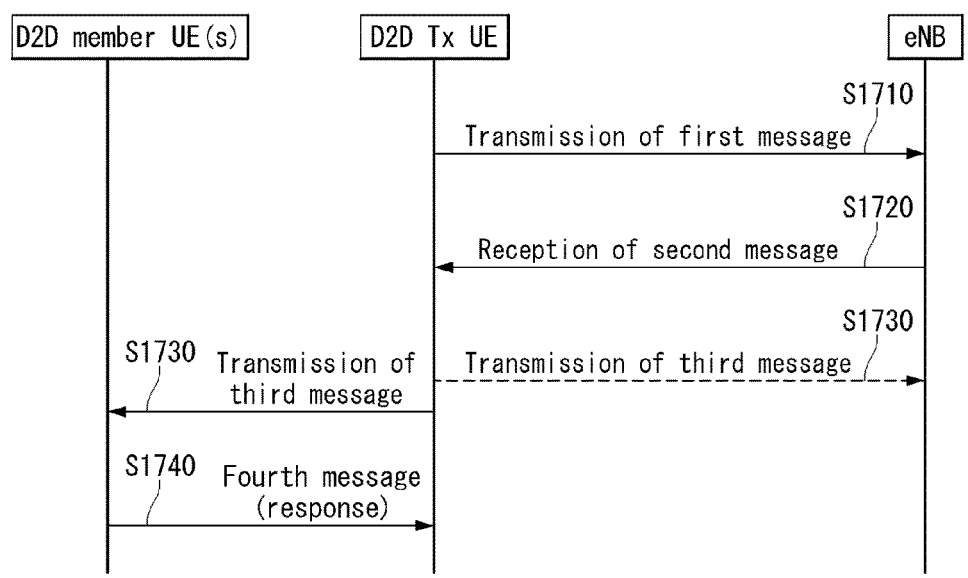
FIG. 17 is a flow diagram illustrating one example of a method for performing D2D communication of FIG. 16 according to the present invention.

FIG. 17 is a flow diagram illustrating one example of a method for performing D2D communication of FIG. 16 according to the present invention.

Since the S1710 and the S1720 step are the same as the S1310 and the S1320 step of FIG. 13, only the different part will be described.

After the S1720 step, the D2D transmitting UE groupcasts the third message to the member UEs of the group S1730. At this time, the group can include the D2D transmitting UE.

Also, the D2D transmitting UE can transmit the third message to the eNB.

Afterwards, member UEs of the group transmits the fourth message to the D2D transmitting UE as a response to the reception of the third message S1740.

The D2D transmitting UE can check from the received fourth message whether member UEs have received the third message correctly.

Outside Network Coverage

To maintain consistency between D2D communication operation of the inside network coverage scheme and D2D communication operation of the outside network coverage scheme, the concept of a cluster head and clustering employed for the outside network coverage scheme will be described below.

The cluster head refers to a D2D UE capable of partly performing scheduling of other D2D UEs on behalf of the eNB.

The scheduling performed by the cluster head is aimed for a simple function such as resource collision avoidance rather than a complex one such as scheduling performed by the eNB scheduler.

In the case of outside network coverage, all of the D2D UEs can play the role of a cluster head.

However, if multiple D2D UEs tries to act as a cluster head at the same time, an appropriate rule or negotiation for selecting the cluster head may be needed.

In case scheduling is carried out by a cluster head UE (namely, in the case of no centralized scheduler present), the D2D UE has to monitor a signal across the whole operating time unless the D2D UE is in the transmission mode (for example, WI-FI). In this case, the D2D UE consumes large power through continuous monitoring operation.

In the following, described will be a method for minimizing power consumption when D2D communication is performed according to the outside network coverage scheme.

In the outside network coverage scheme, D2D UEs form a cluster, and a D2D UE corresponding to the cluster head adjusts or allocates individual frequency-time radio access resources to the respective member UEs within the cluster.

At this time, clustering can be performed so that interference among D2D UEs can be minimized.

Also, the cluster head can be a UE located at the cell edge or can be determined by the eNB.

Multiple clusters can be formed, and in this case, multiple cluster heads can be defined.

Cluster heads of the respective clusters can specify individual scheduling intervals and offsets for all of the member UEs that have to monitor (possibly) transmitted signals in a given time period.

In this case, some member UEs may wake up periodically with a period of P1 and an offset of t1 to receive scheduling information while other member UEs may wake up periodically with a period of P2 and an offset of t2.

At this time, each member UE can transmit or receive a signal by using the scheduling information decoded by the member UE.

To reduce power consumption, it is preferable that transmission and reception timing are aligned for as many D2D UEs as possible so that all of the D2D UEs can transmit or receive their messages with the same period and offset.

As a result, to save energy by reducing power consumption, the time interval for a sleep mode where little power is consumed for D2D communication is extended longer than the time interval of a previous sleep mode; on the other hand, the time interval of a wake-up mode where power consumption is high becomes shorter than the time interval of a previous wake-up mode.

Except for the time interval where a signal is transmitted or monitored, it is preferable that D2D UEs are implemented to always enter the sleep mode to reduce power consumption any further.

Therefore, in the outside network coverage scheme, scheduling-related coordination with respect to D2D UEs through a cluster head UE can be advantageous in terms of energy saving.

Figure 18:
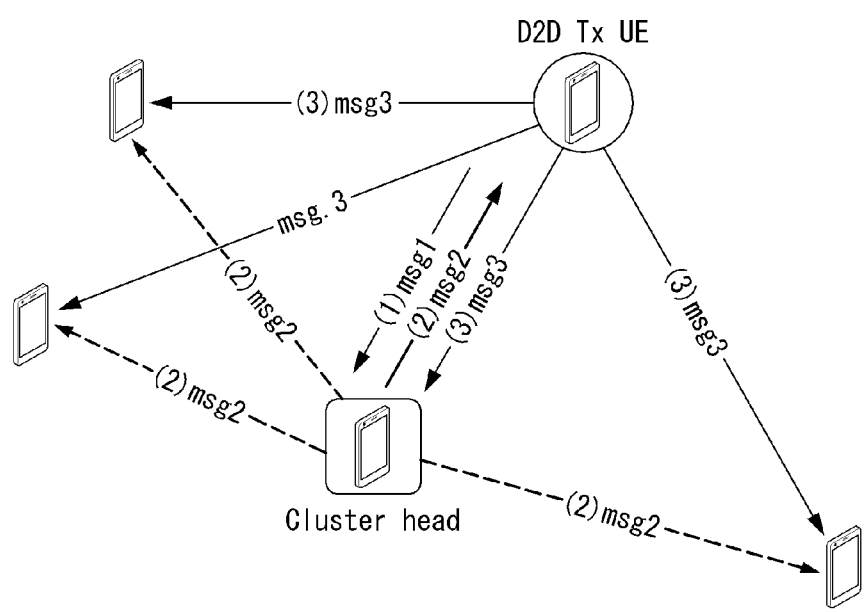
FIG. 18 illustrates one example of a method for performing D2D communication through a cluster head in the outside network coverage according to the present invention.

FIG. 18 illustrates one example of a method for performing D2D communication through a cluster head in the outside network coverage according to the present invention.

As shown in FIG. 18, D2D communication according to the outside network coverage scheme can be performed through a cluster head, D2D transmitting UE, and at least one D2D receiving UE. The cluster head UE provides a scheduler function of the eNB. The cluster head UE and the D2D transmitting UE can be the same UE.

With reference to FIG. 18, the D2D transmitting UE transmits a first message to the cluster head S1810. At this time, the first message can be transmitted according to the broadcast scheme and corresponds to the message related to a request for resources to broadcast a message of the D2D transmitting UE at a particular time point.

Afterwards, the cluster head transmits to the D2D transmitting UE a second message including scheduling information, coordination information, or resource utilization information S1820.

At this time, the second message can be a response to the first message.

The second message can further include timing information related to transmission and reception.

At this time, the D2D receiving UE can monitor the second message and decode a third message transmitted from the D2D transmitting UE by using the monitored second message.

Afterwards, the D2D transmitting UE broadcasts the third message through a radio resource area allocated on the basis of the received second message S1830.

At this time, the allocated radio resource area includes the D2D link signal interval and the guard interval described in FIG. 12.

The S1810 to S1830 steps described above can be applied in the same way to the D2D communication based on unicast or groupcast scheme.

The fourth message described in the S1420 step of FIG. 14 and the S1550 step of FIG. 15 can be used in the same way for the method of FIG. 18 to help recovering the error of the third message. In this case, the cluster head can transmit the fourth message to the D2D receiving UEs on behalf of the D2D transmitting UE.

Figure 6:
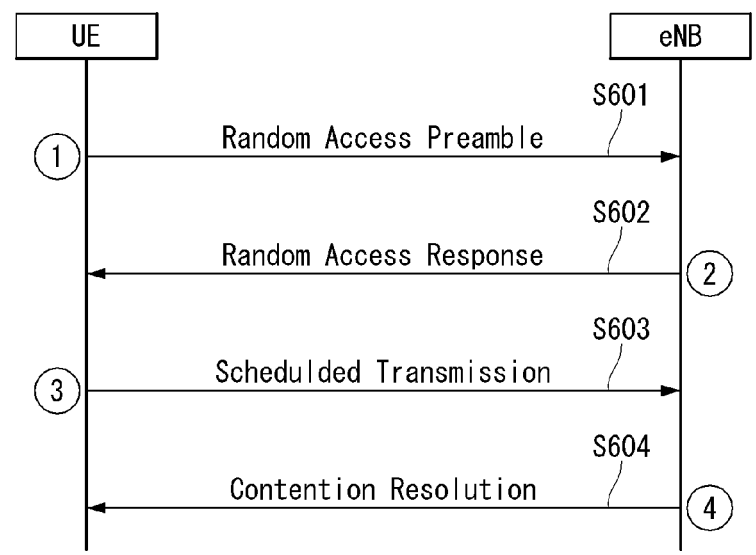
FIG. 6 illustrates one example of a random access procedure in the LTE system.
Figure 6:
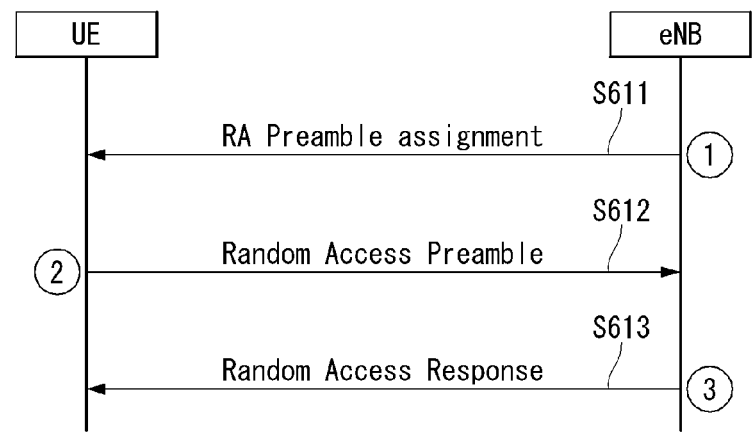
Figure 7:
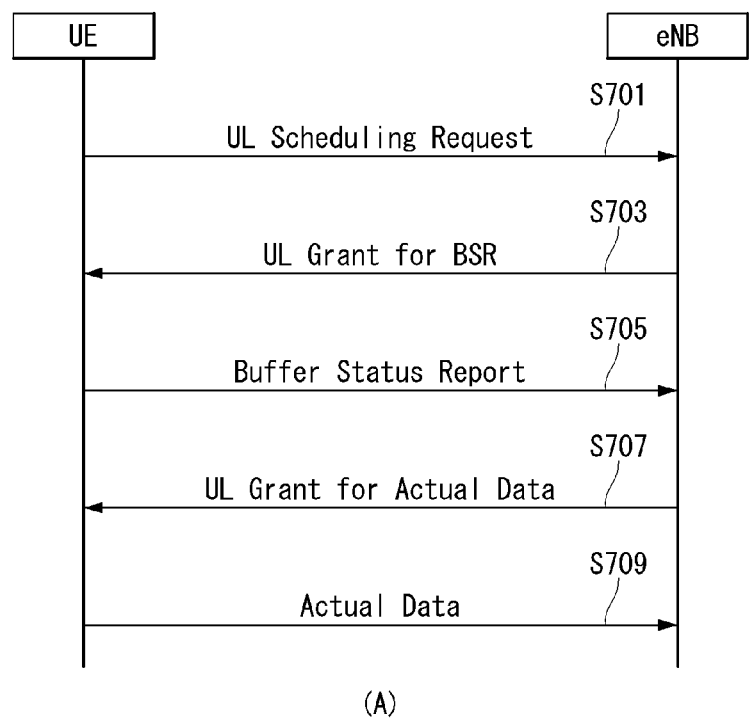
FIG. 7 illustrates one example of a uplink resource allocation procedure based on base station scheduling in the LTE system.
Figure 7:
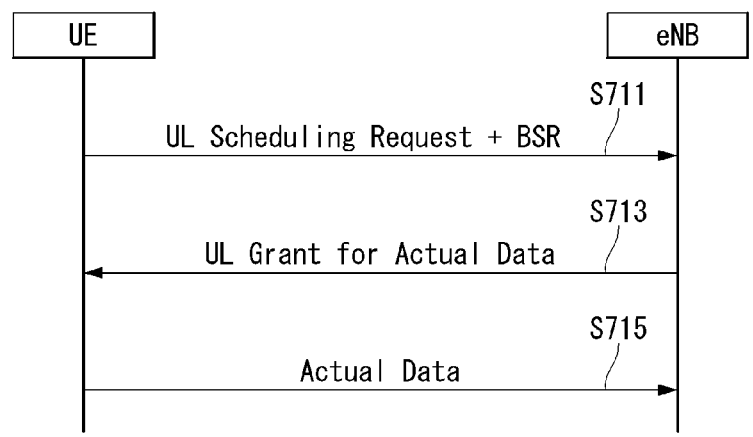

The messages mentioned in FIGS. 14 to 18 can be implemented by using the message used in the RACH procedure of FIG. 6 or the messages used in the UL resource allocation procedure of FIG. 7.

In what follows, described with reference to FIGS. 19 and 20 will be a performance evaluation result of D2D communication when D2D UEs are clustered.

Figure 19:
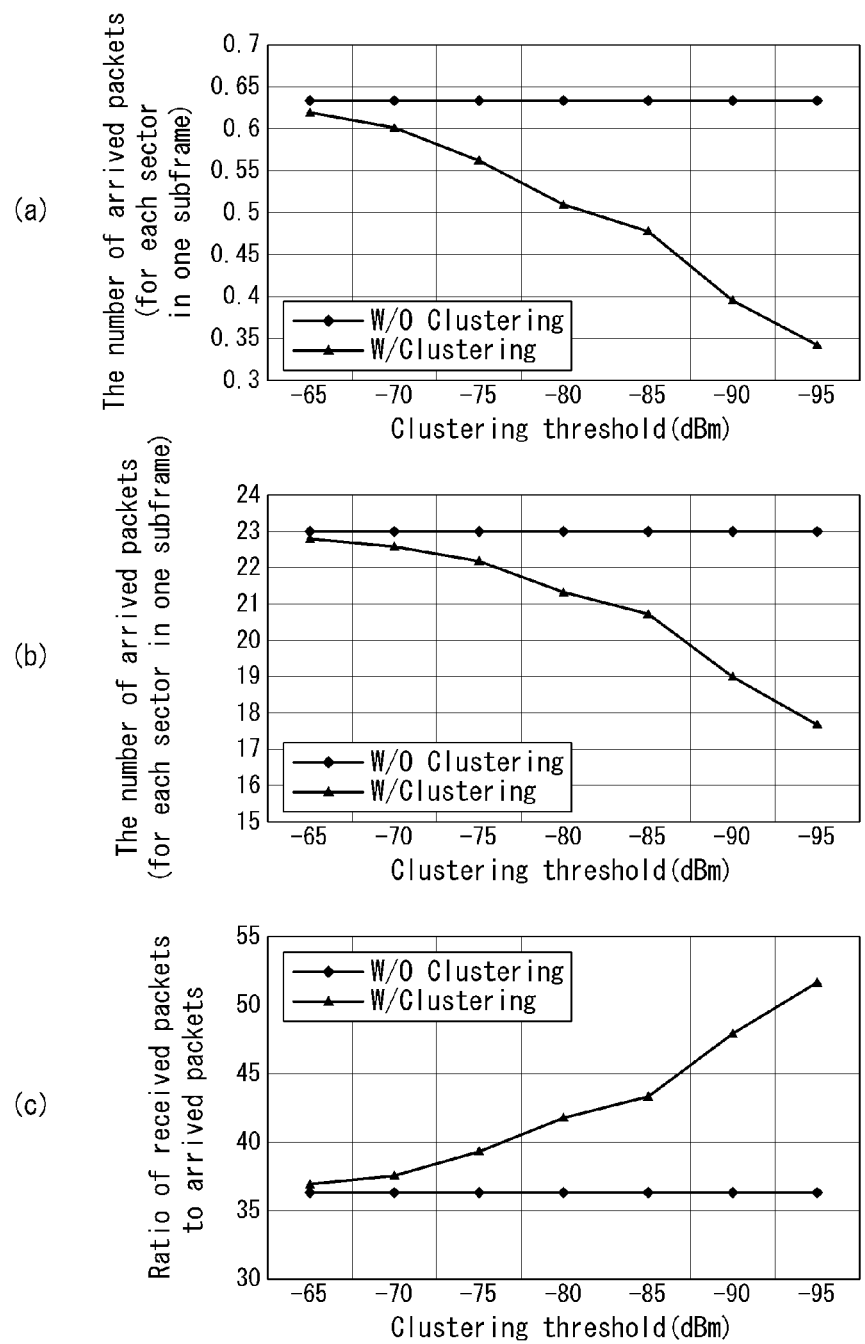
FIG. 19 illustrates one example of an evaluation result of a D2D terminal when clustering is employed against the case when clustering is not employed.
Figure 20:
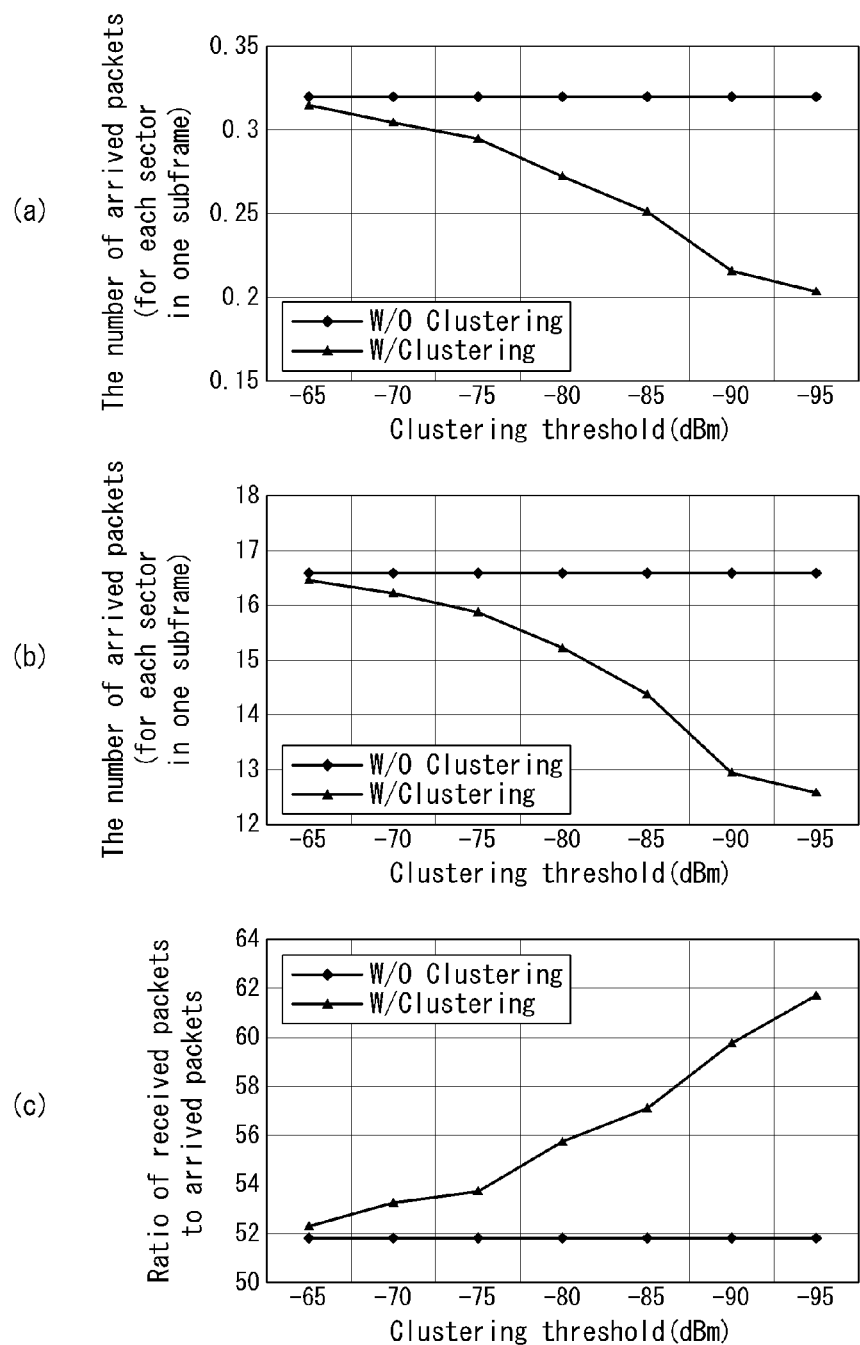
FIG. 20 illustrates another example of an evaluation result of a D2D terminal when clustering is employed against the case when clustering is not employed.

The experimental results of FIGS. 19 and 20 use the conditions shown in Table. 1.

TABLE 1

| | |
|---|---|
| Carrier frequency | 700 MHz |
| The number of UEs | 1,824 |
| Frequency offset | 0 Hz (not considered) |
| Channel model | D2D outdoor-to-outdoor channel model |
| Number of antennas | 1 Tx, 2 Rx |
| System bandwidth | 10 MHz |
| CP length | Normal CP (10 symbols for codeword mapping, 2 symbols for DM RS) |
| Number of allocated RBs | 50 RBs |
| Modulation | QPSK |
| Coding rate | 1/3 |
| Traffic model | Non-full buffer traffic (FTP model 2 with packet size, 0.5 Kbyte) |
| Clustering | Cluster head: random selection from broadcast Tx UE(s)<br>Cluster range: <−112 dBm<br>Disjoint clustering of cluster members<br>Cluster change according to RSRP condition<br>One broadcast transmission at a time instance (transmission opportunity) in a cluster (if not selected, one subframe delayed and tried again in contention base) |
| Packet duration | 1 subframe |
| Packet arrival rate | 5 ms, 10 ms |
| Packet size | 0.5 Kbyte |

FIGS. 19 and 20 show D2D UE clustering evaluation results in view of broadcasting signals when clustering according to the present invention is employed against a non-clustering case.

FIG. 19 illustrates the case when packet arrival time is 5 ms, and FIG. 20 illustrates the case when packet arrival time is 10 ms.

FTP model 2 uses a packet size of 0.5 Kbytes in one subframe interval and average packet arrival time of 5 ms or 10 ms. A D2D transmitting UE(s) broadcasting a message can be selected in random fashion, and a cluster can include at least one D2D transmitting UE.

Afterwards, a delay due to simultaneous transmission by a plurality of D2D transmitting UEs may amount to only one subframe delay and can be implemented by contention-based retransmission afterwards.

In other words, if the cluster size increases, the number of D2D transmitting UEs is increased; eventually, more successful packet reception can be expected over the whole cell layout through space reuse.

First, FIGS. 19(a) and 20(a) show the number of packets arriving at a transmission buffer according to the cluster size defined by a clustering threshold value.

Different from a non-clustering method, as the cluster size is increased, the number of arrived packets according to the clustering method is reduced due to delayed packets of the D2D transmitting UEs not selected for clustering.

Although a plurality of D2D transmitting UEs have packets to be transmitted at specific transmission time in their buffer, only those packets of a selected D2D transmitting UE are allowed to be transmitted.

At this time, packets of other D2D UEs are delayed until the cluster head resolves contention for selection among D2D transmitting UEs.

The reason why the number of D2D transmitting UEs is strictly controlled is to manage an interference environment where a plurality of D2D transmitting UEs spread interference and to ensure broadcast coverage.

Similar to FIGS. 19(a) and 20(a), FIGS. 19(b) and 20(b) show the relationship where the number of received packets is reduced as the cluster size increases.

A considerable effect through clustering can be observed from FIGS. 19(c) and 20(c).

In other words, FIGS. 19(c) and 20(c) show variation of the ratios of arrived packets to received packets according to the clustering threshold (size).

As shown in FIGS. 19(c) and 20(c), appropriate managing of interference sources such as clustering (for example, limiting the number of D2D transmitting UEs in a cluster) can ensure a channel environment with reduced interference.

Therefore, clustering according to the present invention provides superior performance to non-clustering methods in view of the number of successful reception per broadcast transmission which can be interpreted as broadcast transmission coverage.

Clustering Size Control According to Cell Loading Factor

As described with reference to FIGS. 19 and 20, in case D2D communication performs clustering, if a cell loading factor related to data transmission becomes excessively large (for example, if packet duration is excessively large compared with mean arrival time of packet as in an example where packet duration is 1 ms and mean arrival time of packet is 5 ms), a packet attempted to be transmitted (or a sub-packet transmitted during a particular TTI) runs into more collision due to other D2D transmitting UEs, thereby increasing a transmission delay.

One example of a large cell loading factor is transmission of an instant message.

On the contrary, if the cell loading factor is relatively small, effects of a transmission delay are not significant, but benefits from clustering can be obtained sufficiently.

Therefore, in a scheduler such as a cluster head which determines transmission time of a D2D transmitting UE has to perform a method for preventing collision between packets by taking into account the cell loading factor. In what follows, described in detail with reference to FIG. 21 will be a method for preventing collision between packets by taking into account the cell loading factor.

Figure 21:
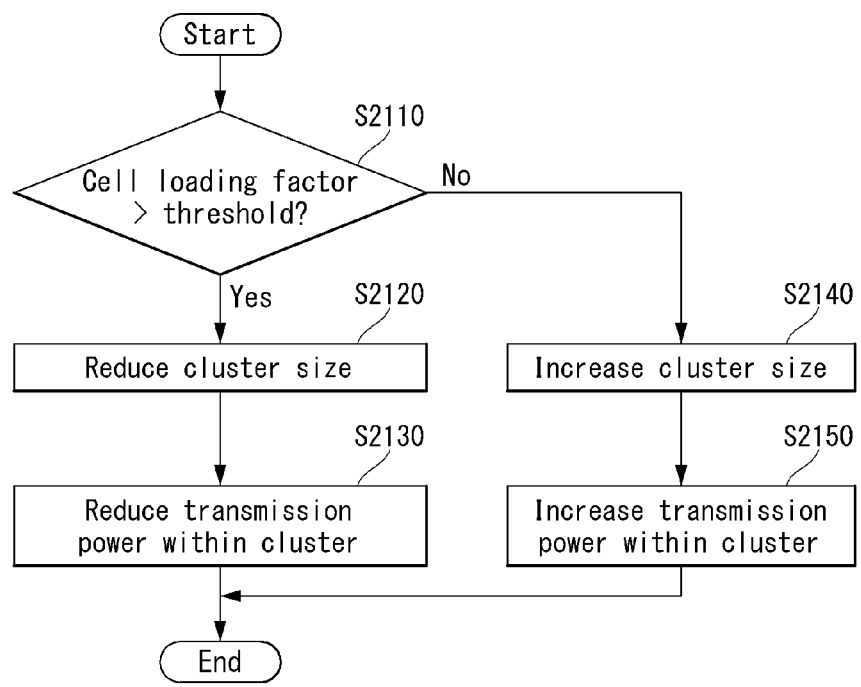
FIG. 21 is a flow diagram illustrating one example of a method for controlling a cluster size in D2D communication due to a cell loading factor according to the present invention.

FIG. 21 is a flow diagram illustrating one example of a method for controlling a cluster size in D2D communication due to a cell loading factor according to the present invention.

First, a cluster head UE determines whether the cell loading factor is larger or smaller than a threshold (or a specific value, a predetermined value, or a predefined value) S2110. The cluster head UE can correspond to a (D2D) scheduler.

If the cell loading factor is found to be large from the determination result, the cluster head UE reduces the cluster size (or cluster coverage) S2120. In other words, the cluster head UE controls the number of D2D transmitting UEs attempting data transmission within the cluster by adjusting the cluster size.

On the contrary, if the cell loading factor is small, the cluster head UE increases the cluster size S2140.

As one example, if it is found that the cell loading factor is large, the cluster head UE can control the metric (for example, the Reference Signal Received Power (RSRP) value that the cluster head (or cluster representative UE) receives from D2D UEs trying to become members of the cluster) which acts as a criterion for clustering more strictly.

For example, if the cell loading factor is very small, the cluster head UE can perform clustering on the D2D UEs exhibiting an RSRP value of less than 112.0 dBm.

In other words, if the cell loading factor is large, the cluster head UE increases the RSRP value which acts as a criteria for clustering, thereby restricting the cluster size (or coverage). In this case, the D2D transmitting UE within the cluster can transmit a signal with much less power S2130.

On the contrary, if the cell loading factor is small, the D2D transmitting UE within the cluster can transmit a signal with much higher power S2150.

Therefore, in case the cluster size is controlled according to the cell loading factor, transmission power of D2D transmitting UEs can be controlled.

Therefore, if the cell loading factor is large, the cluster head UE allocates much lower transmission power while reducing the cluster size; on the contrary, if the cell loading factor is small, the cluster head UE allocates much higher transmission power while increasing the cluster size S2130, S2150.

Partial Network Coverage

Figure 22:
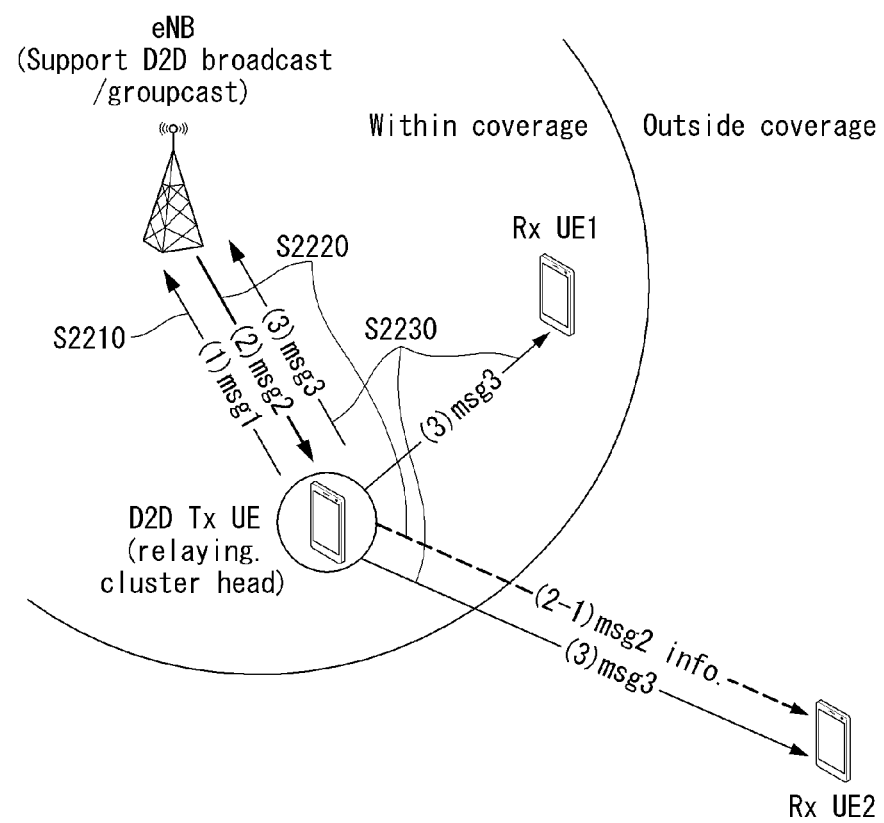
FIG. 22 illustrates one example of a method for performing D2D communication in partial network coverage according to the present invention.

FIG. 22 illustrates one example of a method for performing D2D communication in partial network coverage according to the present invention.

As shown in FIG. 22, D2D communication can be performed according to partial network coverage scheme. In other words, D2D communication can be performed in a situation where a D2D transmitting UE is located within particular network converage, part of D2D receiving UEs are located within the particular network coverage, and other UEs are located outside the particular network coverage (across the network coverage boundary).

At this time, the particular network coverage can correspond to the coverage supported by the eNB.

The D2D transmitting UE can be a timing reference.

In other words, D2D receiving UEs can perform D2D communication in synchronization with the timing reference of the D2D transmitting UE.

If the D2D transmitting UE is located outside the particular network coverage, the timing reference of the D2D transmitting UE tends to readily loses synchronization with the timing reference of the network.

Therefore, it is preferable that the D2D transmitting UE is located within the particular network coverage.

The asynchronous operation between a network and a cluster/group causes high interference between UEs located outside coverage and UEs within the coverage.

Therefore, if a particular cluster includes D2D UEs located within network coverage and D2D UEs outside the network coverage, to remove interference that can be caused among D2D UEs, it is preferable to have one of D2D UEs located within the network coverage as a cluster head for controlling interference (as a timing reference).

Referring to FIG. 22, a first, a second, and a third message can be used for a purpose similar to the one described earlier.

As shown in FIG. 22, the second message transmitted from the eNB to the D2D transmitting UE is not transmitted to the D2D receiving UE (UE 2) located outside the network coverage.

In case the UE 2 fails to receive the second message, the UE 2 is unable to obtain the information such as decoding information and reception timing information. Therefore, the UE 2 cannot decode the third message that the D2D transmitting UE transmits.

Therefore, the D2D transmitting UE relays the second message received from the eNB to the UE 2, namely the D2D receiving UE located outside the network coverage.

At this time, the third message broadcast from the cluster head according to the partial network coverage scheme may reach a D2D receiving UE located outside the particular network coverage.

Otherwise, the D2D receiving UE 2 located outside the particular network coverage is unable to receive the third message. In other words, according to the partial network coverage scheme, the D2D transmitting UE performs a relaying operation by which the D2D transmitting UE receives the second message from the eNB and again transmits the received second message to the D2D receiving UE located outside the particular network coverage S2220.

As a result, (D2D) interference caused by unsynchronized D2D UEs outside the particular network coverage on the D2D UEs within the particular network coverage can be well controlled by synchronizing all of member UEs within a cluster and all of the UEs within relaying coverage with each other.

Figure 23:
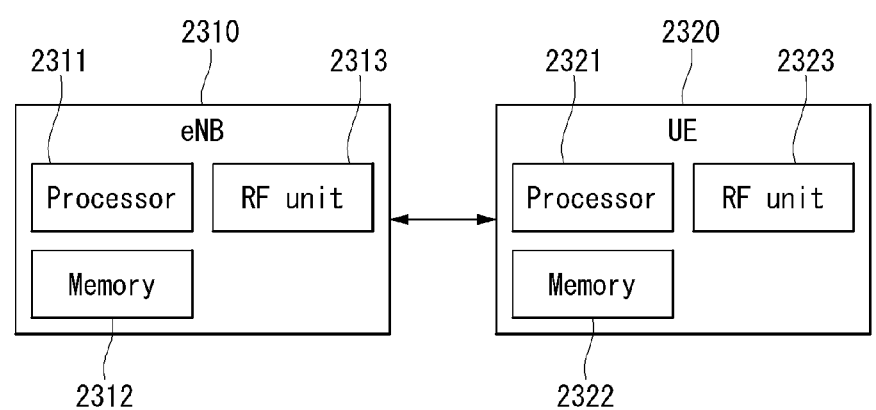
FIG. 23 illustrates one example of internal block diagrams of a base station and a terminal according to the present invention.

FIG. 23 illustrates one example of internal block diagrams of an eNB and a UE according to the present invention.

As shown in FIG. 23, the eNB 2310 and the UE 2320 comprise a communication unit (transmitting and receiving unit or RF unit) 2313, 2323, a processor 2311, 2321, and a memory 2312, 2322.

In addition to the above, the eNB and the UE can further comprise an input unit and an output unit.

The communication unit 2313, 2323, processor 2311, 2321, input unit, output unit, and memory 2312, 2322 are functionally connected to each other to perform the method according to the present invention.

The communication unit (transmitting and receiving unit or RF unit) 2313, 2323, if receiving information generated according to the Physical Layer (PHY) protocol, transforms the received information into the Radio-Frequency (RF) spectrum; performs filtering, amplification, and the like; and transmits the processed information through an antenna. Also, the communication unit performs the function of transforming an RF signal received from the antenna to a frequency band in which the received RF signal can be processed according to the PHY protocol and filtering on the transformed RF signal.

And the communication unit can include a switch function for switching between the transmission and the reception functions.

The processor 2311, 2321 implements a function, procedure, and/or method proposed in the present document. Layers of a radio interface protocol can be implemented by the processor.

The processor controls the UE to transmit a first message requesting allocation of radio resources to be used for D2D communication to a cluster head UE; to receive a second message including radio resource allocation information from the cluster head UE; and transmit data through the radio resource area allocated through the second message.

Also, the processor control the UE to transmit the first message requesting allocation of radio resources to be used for D2D communication to the eNB; to receive the second message including radio resource allocation information from the eNB; and to transmit data through the radio resource area allocated through the second message.

Also, in case a specific D2D UE from among the at least one D2D receiving UE is located outside the network coverage supported by the eNB, the processor controls so that the second message can be relayed to the specific D2D UE.

The processor may be represented by a controller, control unit, or computer.

The memory 2312, 2322, being connected to the processor, stores protocol or parameters for performing D2D communication.

The processor 2311, 2321 can include Application-Specific Integrated Circuit (ASIC), other chipsets, logical circuit and/or data processing device. The memory can include ROM (Read-Only Memory), RAM (Random Access Memory), flash memory, memory card, storage medium and/or other storage device. The communication unit can include baseband circuit for processing a radio signal. In case an embodiment is implemented in the form of software, the method described above can be implemented by a module (process or function) which performs the function described above.

A module is stored in the memory and is carried out by the processor. The memory can be installed inside or outside the processor and can be connected to the processor through various well-known means.

The output unit (display unit) is controlled by the processor and displays information output from the processor along with key input signals generated from a key input unit and various kinds of information signals from the processor.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

A method for performing D2D communication according to the present invention is not limited to the embodiments described above, but the entire embodiments can be combined or part of the embodiments can be combined selectively so that various modifications can be made to the embodiments.

Meanwhile, a method for performing D2D communication according to the present invention can be implemented in the form of processor-readable program codes in a recording medium that can be read by a processor installed in a network device. The processor readable recording medium includes all kinds of recording devices storing data that can be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium can be distributed across computer systems connected to each other through a network, and program codes that can be read by the processor can be stored and run in a distributed manner.

Throughout the document, preferred embodiments of the present invention have been described with referenced to appended drawings; however, the present invention is not limited to the embodiments above. Rather, it should be noted that various modifications of the present invention is made by those skilled in the art to which the present invention belongs without leaving the technical scope of the present invention defined by the appended claims, and these modifications should not be understood individually from the technical principles or aspects of the present invention.

This document describes both of the product invention and process invention, and depending on the needs, descriptions of both inventions can be applied in a complementary manner.

INDUSTRIAL APPLICABILITY

The present invention provides a method for performing Device-to-Device (D2D) communication in a wireless communication system.

The invention claimed is:

1. A method for performing, by a device-to-device (D2D) transmitting user equipment (UE), D2D communication in a wireless communication system, the method comprising:
    transmitting, to a cluster head UE, a first message requesting allocation of radio resources to be used for the D2D communication;
    receiving, from the cluster head UE, a second message including radio resource allocation information,
    wherein the second message further includes scheduling information for each D2D UE that D2D UEs within a cluster use to monitor a specific signal, and
    wherein the radio resource allocation information includes a time-frequency resource for the D2D transmitting UE to transmit data and a time-frequency resource for at least one D2D receiving UE to receive the data; and
    transmitting the data in a radio resource area allocated by the second message,
    wherein the data is transmitted to the cluster head UE and the at least one D2D receiving UE,
    wherein the D2D transmitting UE, the cluster head UE, and the at least one D2D receiving UE are included in the cluster,
    wherein a cluster size is changed according to a cell loading factor,
    wherein, when the cell loading factor is larger than a threshold, the cluster size becomes small, and
    wherein, when the cell loading factor is smaller than the threshold, the cluster size becomes large.

2. The method of claim 1, wherein the D2D UEs include the D2D transmitting UE and the at least one D2D receiving UE.

3. The method of claim 1, wherein the scheduling information includes a scheduling interval and an offset.

4. The method of claim 1, wherein, when the cluster size becomes small, a transmission power of the D2D UEs within the cluster is set to a low value, and wherein, when the cluster size becomes large, the transmission power of the D2D UEs within the cluster is set to a high value.

5. The method of claim 1, further comprising:

relaying the second message to a specific D2D UE when the specific D2D UE among the at least one D2D receiving UE is located outside a network coverage supported by an evolved Node B (eNB).

6. A device-to-device (D2D) transmitting user equipment (UE) for performing D2D communication in a wireless communication system, the D2D transmitting UE comprising:

a transceiver; and
a processor functionally connected to the transceiver,
wherein the processor is configured to:
control the transceiver to transmit, to a cluster head UE, a first message requesting allocation of radio resources to be used for the D2D communication,
control the transceiver to receive, from the cluster head UE, a second message including radio resource allocation information,
wherein the second message further includes scheduling information for each D2D UE that D2D UEs within a cluster use to monitor a specific signal, and
wherein the radio resource allocation information includes a time-frequency resource for the D2D transmitting UE to transmit data and a time-frequency resource for at least one D2D receiving UE to receive the data, and
control the transceiver to transmit the data in a radio resource area allocated by the second message,
wherein the data is transmitted to the cluster head UE and the at least one D2D receiving UE,
wherein the D2D transmitting UE, the cluster head UE, and the at least one D2D receiving UE are included in the cluster,
wherein a cluster size is changed according to a cell loading factor,
wherein, when the cell loading factor is larger than a threshold, the cluster size becomes small, and
wherein, when the cell loading factor is smaller than the threshold, the cluster size becomes large.

* * * * *